United States Patent
Aoki et al.

(10) Patent No.: US 10,556,176 B2
(45) Date of Patent: Feb. 11, 2020

(54) VIBRATION CONTROL SYSTEM, VIBRATION CONTROL METHOD, AND NON-TRANSITORY COMPUTER-READABLE STORAGE MEDIUM WITH EXECUTABLE VIBRATION CONTROL PROGRAM STORED THEREON

(71) Applicant: NINTENDO CO., LTD., Kyoto-shi, Kyoto (JP)

(72) Inventors: Takafumi Aoki, Kyoto (JP); Kei Yamashita, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 15/656,240

(22) Filed: Jul. 21, 2017

(65) Prior Publication Data

US 2018/0028911 A1 Feb. 1, 2018

(30) Foreign Application Priority Data

Jul. 26, 2016 (JP) .................................. 2016-146079
Jan. 12, 2017 (JP) .................................. 2017-003244

(51) Int. Cl.
*A63F 13/285* (2014.01)
*A63F 13/23* (2014.01)
(Continued)

(52) U.S. Cl.
CPC .......... *A63F 13/285* (2014.09); *A63F 13/211* (2014.09); *A63F 13/23* (2014.09); *A63F 13/50* (2014.09)

(58) Field of Classification Search
CPC ... A63F 13/285; G06F 3/016; G06F 2203/013
See application file for complete search history.

(56) References Cited

U.S. PATENT DOCUMENTS

2003/0090460 A1* 5/2003 Schena ................... A63F 13/06
  345/156
2006/0046843 A1 3/2006 Nakajima
(Continued)

FOREIGN PATENT DOCUMENTS

EP 1 057 504 A2 12/2000
JP 2006-068210 3/2006
(Continued)

OTHER PUBLICATIONS

Aoki, et al., U.S. Appl. No. 15/656,222, filed Jul. 21, 2017 (90 pages).

*Primary Examiner* — Jay Trent Liddle
(74) *Attorney, Agent, or Firm* — Nixon & Vanderhye PC

(57) ABSTRACT

A vibration control system includes a first vibration command generation module that generates first vibration data representing a first time waveform, a second vibration command generation module that generates second vibration data representing a second time waveform, a selection module that selects, when the first vibration data generated by the first vibration command generation module and the second vibration data generated by the second vibration command generation module are input, vibration data representing a time waveform greater in amplitude every prescribed period based on an amplitude of the first time waveform represented by the first vibration data and an amplitude of the second time waveform represented by the second vibration data, and a vibration control module that causes a terminal to vibrate based on the vibration data selected by the selection module.

26 Claims, 21 Drawing Sheets

(51) Int. Cl.
*A63F 13/211* (2014.01)
*A63F 13/50* (2014.01)

(56) References Cited

U.S. PATENT DOCUMENTS

| | | |
|---|---|---|
| 2006/0290662 A1 | 12/2006 | Houston et al. |
| 2007/0285216 A1* | 12/2007 | Tierling ................ A63F 13/06 340/407.1 |
| 2011/0190058 A1* | 8/2011 | Houston ................ A63F 13/06 463/36 |
| 2011/0248817 A1* | 10/2011 | Houston ................ A63F 13/06 340/4.2 |
| 2013/0038603 A1* | 2/2013 | Bae ........................ G06F 3/016 345/419 |
| 2013/0165226 A1* | 6/2013 | Thorner ................. G06F 3/011 463/37 |
| 2013/0281212 A1 | 10/2013 | Tsuchiya et al. |
| 2014/0285453 A1* | 9/2014 | Park ....................... G06F 3/016 345/173 |
| 2016/0163165 A1* | 6/2016 | Morrell ................... G08B 6/00 340/407.1 |
| 2017/0087458 A1* | 3/2017 | Nakagawa .............. A63F 13/54 |

FOREIGN PATENT DOCUMENTS

| | | |
|---|---|---|
| JP | 2013-236909 | 11/2013 |
| WO | 2012/125924 A2 | 9/2012 |

\* cited by examiner

FIG.4
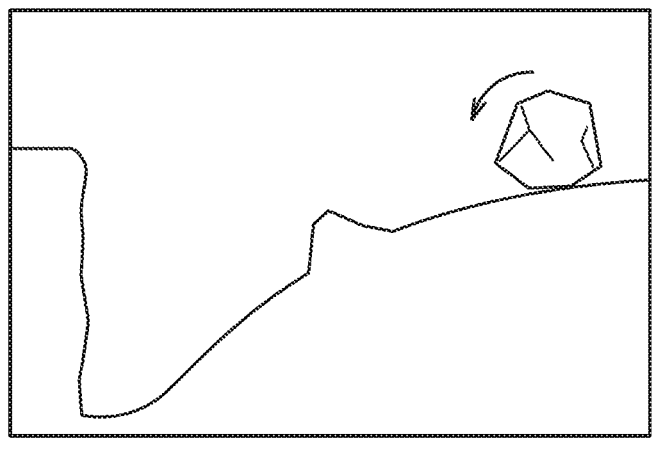
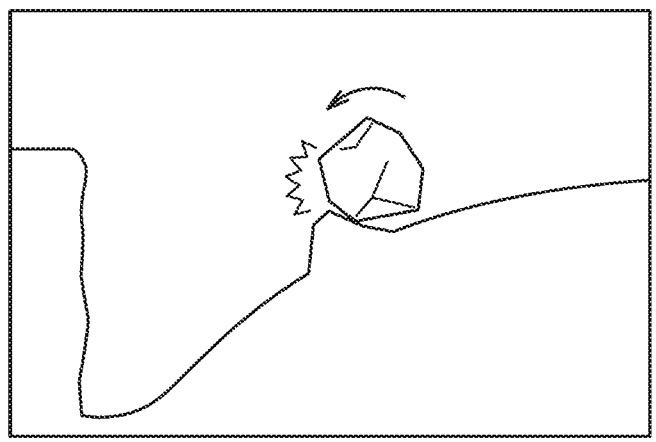

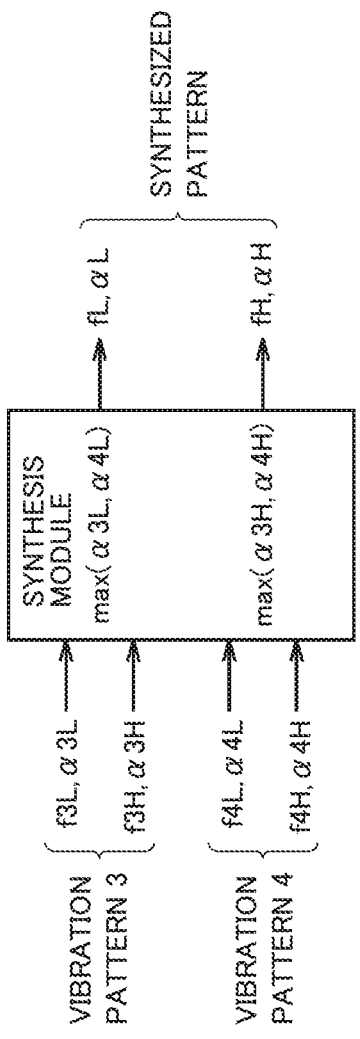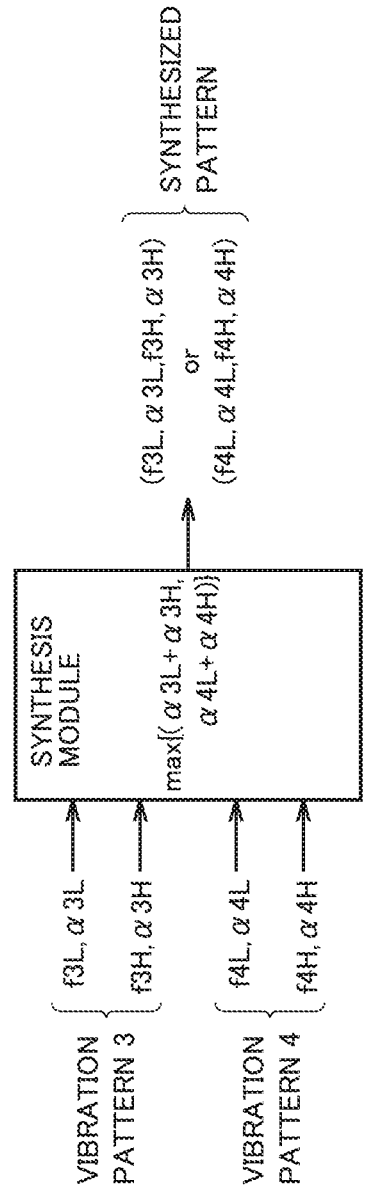

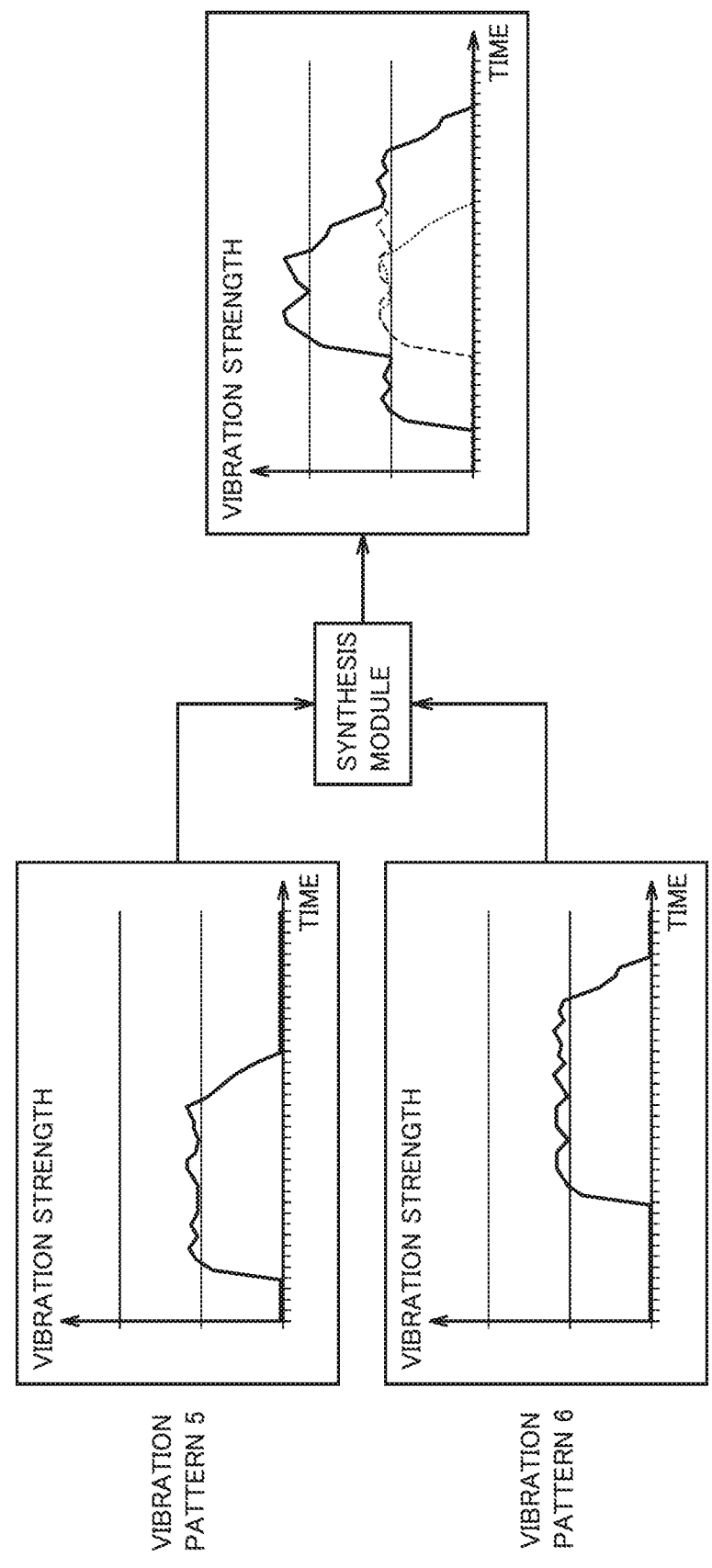

FIG.12

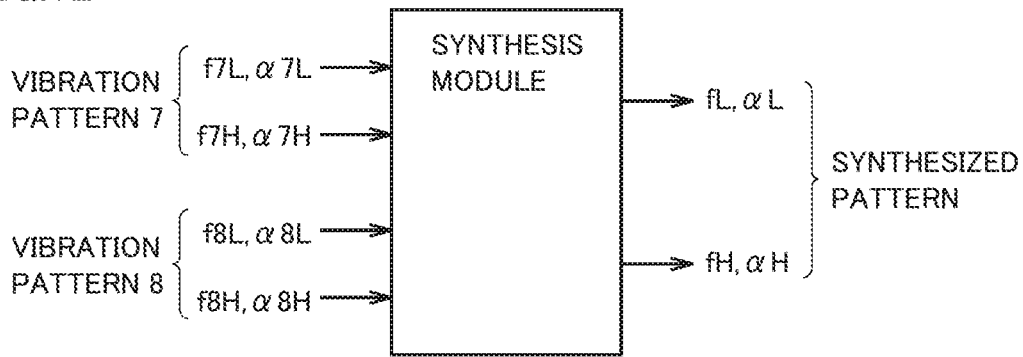

(1) $fL \leftarrow \{f7L, f8L; \max(\alpha 7L, \alpha 8L)\}, \quad \alpha L \leftarrow \alpha 7L + \alpha 8L$
$fH \leftarrow \{f7H, f8H; \max(\alpha 7H, \alpha 8H)\}, \quad \alpha H \leftarrow \alpha 7H + \alpha 8H$ (2) $fL \leftarrow (f7L+f8L)/2, \quad \alpha L \leftarrow \alpha 7L + \alpha 8L$
$fH \leftarrow (f7H+f8H)/2, \quad \alpha H \leftarrow \alpha 7H + \alpha 8H$ (3) $fL \leftarrow \dfrac{\alpha 7L \cdot f7L + \alpha 8L \cdot f8L}{\alpha 7L + \alpha 8L}, \quad \alpha L \leftarrow \alpha 7L + \alpha 8L$ $fH \leftarrow \dfrac{\alpha 7H \cdot f7H + \alpha 8H \cdot f8H}{\alpha 7H + \alpha 8H}, \quad \alpha H \leftarrow \alpha 7H + \alpha 8H$

FIG.18

Table 2029:

| Addr. | rad | sin() |
|---|---|---|
| 0 | 0.00000000 | 0.000000000 |
| 1 | 0.00153398 | 0.001533980 |
| 2 | 0.00306796 | 0.003067957 |
| 3 | 0.00460194 | 0.004601926 |
| 4 | 0.00613592 | 0.006135885 |
| 5 | 0.00766990 | 0.007669829 |
| 6 | 0.00920388 | 0.009203755 |
| 7 | 0.01073787 | 0.010737659 |
| 8 | 0.01227185 | 0.012271538 |
| 9 | 0.01380583 | 0.013805389 |
| 10 | 0.01533981 | 0.015339206 |
| 11 | 0.01687379 | 0.016872988 |
| 12 | 0.01840777 | 0.018406730 |
| 13 | 0.01994175 | 0.019940429 |
| 14 | 0.02147573 | 0.021474080 |
| 15 | 0.02300971 | 0.023007681 |
| 16 | 0.02454369 | 0.024541229 |
| 17 | 0.02607767 | 0.026074718 |
| 18 | 0.02761165 | 0.027608146 |
| 19 | 0.02914563 | 0.029141509 |
| 20 | 0.03067962 | 0.030674803 |
| 21 | 0.03221360 | 0.032208025 |
| 22 | 0.03374758 | 0.033741172 |
| 23 | 0.03528156 | 0.035274239 |
| 24 | 0.03681554 | 0.036807223 |
| 25 | 0.03834952 | 0.038340120 |
| 26 | 0.03988350 | 0.039872928 |
| 27 | 0.04141748 | 0.041405641 |
| 28 | 0.04295146 | 0.042938257 |
| 29 | 0.04448544 | 0.044470772 |
| 30 | 0.04601942 | 0.046003182 |
| 31 | 0.04755340 | 0.047535484 |
| 32 | 0.04908739 | 0.049067674 |
| 33 | 0.05062137 | 0.050599749 |
| 34 | 0.05215535 | 0.052131705 |
| 35 | 0.05368933 | 0.053663538 |
| 36 | 0.05522331 | 0.055195244 |
| ⋮ | ⋮ | ⋮ |
| 4095 | 6.28165133 | −0.001533980 |

(1) CURRENT COUNT VALUE (2) CALCULATE NEXT COUNT VALUE BASED ON DESIGNATED FREQUENCY (3) NEXT COUNT VALUE → READ CORRESPONDING sin VALUE (4) CALCULATE COUNT VALUE AFTER NEXT BASED ON DESIGNATED FREQUENCY (5) COUNT VALUE AFTER NEXT → READ CORRESPONDING sin VALUE

VIBRATION CONTROL SYSTEM, VIBRATION CONTROL METHOD, AND NON-TRANSITORY COMPUTER-READABLE STORAGE MEDIUM WITH EXECUTABLE VIBRATION CONTROL PROGRAM STORED THEREON

This nonprovisional application is based on Japanese Patent Applications Nos. 2016-146079 and 2017-003244 filed with the Japan Patent Office on Jul. 26, 2016 and Jan. 12, 2017, respectively, the entire contents of which are hereby incorporated by reference.

FIELD

The present disclosure relates to a vibration control system capable of providing vibrations to a user, a method in the vibration control system, and a non-transitory computer-readable storage medium with an executable program directed to the vibration control system stored thereon.

BACKGROUND AND SUMMARY

Game processing making use of vibrations has conventionally been proposed. A configuration capable of providing a new operational feeling because of variation in vibrations in accordance with a difference in manner of representation of a character has been disclosed. A configuration in which a vibration portion which generates vibrations based on a control signal from an information processing apparatus is arranged inside a grip portion has been disclosed.

An exemplary embodiment provides a method of enhancing a degree of freedom in providing a plurality of types of vibrations to a user.

An exemplary embodiment provides a vibration control system that includes a first vibration command generation module that generates first vibration data representing a first time waveform, a second vibration command generation module that generates second vibration data representing a second time waveform, a selection module that selects, when the first vibration data generated by the first vibration command generation module and the second vibration data generated by the second vibration command generation module are input, vibration data representing a time waveform greater in amplitude every prescribed period based on an amplitude of the first time waveform represented by the first vibration data and an amplitude of the second time waveform represented by the second vibration data, and a vibration control module that causes a terminal to vibrate based on the vibration data selected by the selection module.

The selection module may select the vibration data representing the time waveform greater in amplitude regardless of whether the first time waveform and the second time waveform are identical to or different from each other in frequency.

The first vibration data may be a combination of a value representing a frequency and a value representing an amplitude of the first time waveform. The second vibration data may be a combination of a value representing a frequency and a value representing an amplitude of the second time waveform. The first vibration command generation module may update the first vibration data every prescribed period. The second vibration command generation module may update the second vibration data every prescribed period.

The first vibration command generation module may simultaneously generate a plurality of pieces of vibration data including the first vibration data. The second vibration command generation module may simultaneously generate a plurality of pieces of vibration data including the second vibration data.

The selection module may select, when the plurality of pieces of vibration data generated by the first vibration command generation module and the plurality of pieces of vibration data generated by the second vibration command generation module are input, a plurality of pieces of vibration data including vibration data representing a time waveform greatest in amplitude every prescribed period based on amplitudes of time waveforms represented by respective pieces of vibration data among the plurality of pieces of vibration data generated by the first vibration command generation module and the plurality of pieces of vibration data generated by the second vibration command generation module.

The selection module may select, when the plurality of pieces of vibration data including the first vibration data generated by the first vibration command generation module and the plurality of pieces of vibration data including the second vibration data generated by the second vibration command generation module are input, a plurality of pieces of vibration data greater in total of amplitudes every prescribed period based on a total of amplitudes represented by the plurality of pieces of vibration data generated by the first vibration command generation module and a total of amplitudes represented by the plurality of pieces of vibration data generated by the second vibration command generation module.

The first vibration command generation module may generate third vibration data representing a third time waveform in addition to the first vibration data. The second vibration command generation module may generate fourth vibration data representing a fourth time waveform in addition to the second vibration data. When the first vibration data and the third vibration data generated by the first vibration command generation module and the second vibration data and the fourth vibration data generated by the second vibration command generation module are input, the selection module may select vibration data representing a time waveform greater in amplitude every prescribed period based on the amplitude of the first time waveform represented by the first vibration data and an amplitude of the third time waveform represented by the third vibration data, and select vibration data representing a time waveform greater in amplitude every prescribed period based on the amplitude of the second time waveform represented by the second vibration data and an amplitude of the fourth time waveform represented by the fourth vibration data.

The first vibration data may be a combination of a value representing a frequency and a value representing an amplitude of the first time waveform. The second vibration data may be a combination of a value representing a frequency and a value representing an amplitude of the second time waveform. The third vibration data may be a combination of a value representing a frequency and a value representing an amplitude of the third time waveform. The fourth vibration data may be a combination of a value representing a frequency and a value representing an amplitude of the fourth time waveform. The first vibration command generation module may update the first vibration data and the third vibration data every prescribed period. The second vibration command generation module may update the second vibration data and the fourth vibration data every prescribed period.

The third time waveform may be lower in frequency than the first time waveform and the fourth time waveform may be lower in frequency than the second time waveform.

The vibration control system may further include a game progress module that executes a game application. The first vibration command generation module may generate the first vibration data in response to an event generated by the game progress module. The second vibration command generation module may generate the second vibration data in response to an event generated by the game progress module.

The first vibration command generation module may generate the first vibration data in response to a first event generated by the game progress module. The second vibration command generation module may generate the second vibration data in response to a second event different from the first event.

The game progress module may generate the event in response to an operation by a user.

The first time waveform may exhibit weak and continual vibrations. The second time waveform may exhibit strong and short vibrations.

The terminal includes a vibrator having a plurality of resonance frequencies. A frequency of the first time waveform and a frequency of the second time waveform may be set in accordance with the resonance frequency of the vibrator.

An exemplary embodiment provides a vibration control method that includes generating first vibration data representing a first time waveform, generating second vibration data representing a second time waveform, selecting, when the first vibration data and the second vibration data are input, vibration data representing a time waveform greater in amplitude every prescribed period based on an amplitude of the first time waveform represented by the first vibration data and an amplitude of the second time waveform represented by the second vibration data, and causing a terminal to vibrate based on the selected vibration data.

An exemplary embodiment provides a non-transitory computer-readable storage medium with an executable vibration control program executed by a processor of a terminal stored thereon. The vibration control program causes the processor to perform generating first vibration data representing a first time waveform, generating second vibration data representing a second time waveform, selecting, when the first vibration data and the second vibration data are input, vibration data representing a time waveform greater in amplitude every prescribed period based on an amplitude of the first time waveform represented by the first vibration data and an amplitude of the second time waveform represented by the second vibration data, and causing a terminal to vibrate based on the selected vibration data.

An exemplary embodiment provides a non-transitory computer-readable storage medium with an executable vibration control program executed by a processor of a terminal stored thereon. The vibration control program causes the processor to perform accepting first vibration data representing a first time waveform and second vibration data representing a second time waveform and selecting, when the first vibration data and the second vibration data are input, vibration data representing a time waveform greater in amplitude every prescribed period based on an amplitude of the first time waveform represented by the first vibration data and an amplitude of the second time waveform represented by the second vibration data.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIGS. 4 and 5 show exemplary illustrative non-limiting drawings illustrating processing for controlling a vibration portion in the game system according to the present embodiment.

FIGS. 10A and 10B show exemplary illustrative non-limiting drawings illustrating another type of mounting of the synthesis method in accordance with the selection scheme according to the present embodiment.

FIG. 11 shows an exemplary illustrative non-limiting drawing illustrating a method of synthesizing vibration patterns in accordance with an addition scheme according to the present embodiment.

FIG. 12 shows an exemplary illustrative non-limiting drawing illustrating mounting of the synthesis method in accordance with the addition scheme according to the present embodiment.

FIG. 18 shows an exemplary illustrative non-limiting drawing illustrating processing for generating a drive signal with a reference table in the game system according to the present embodiment.

DETAILED DESCRIPTION OF NON-LIMITING EXAMPLE EMBODIMENTS

Figure 1:
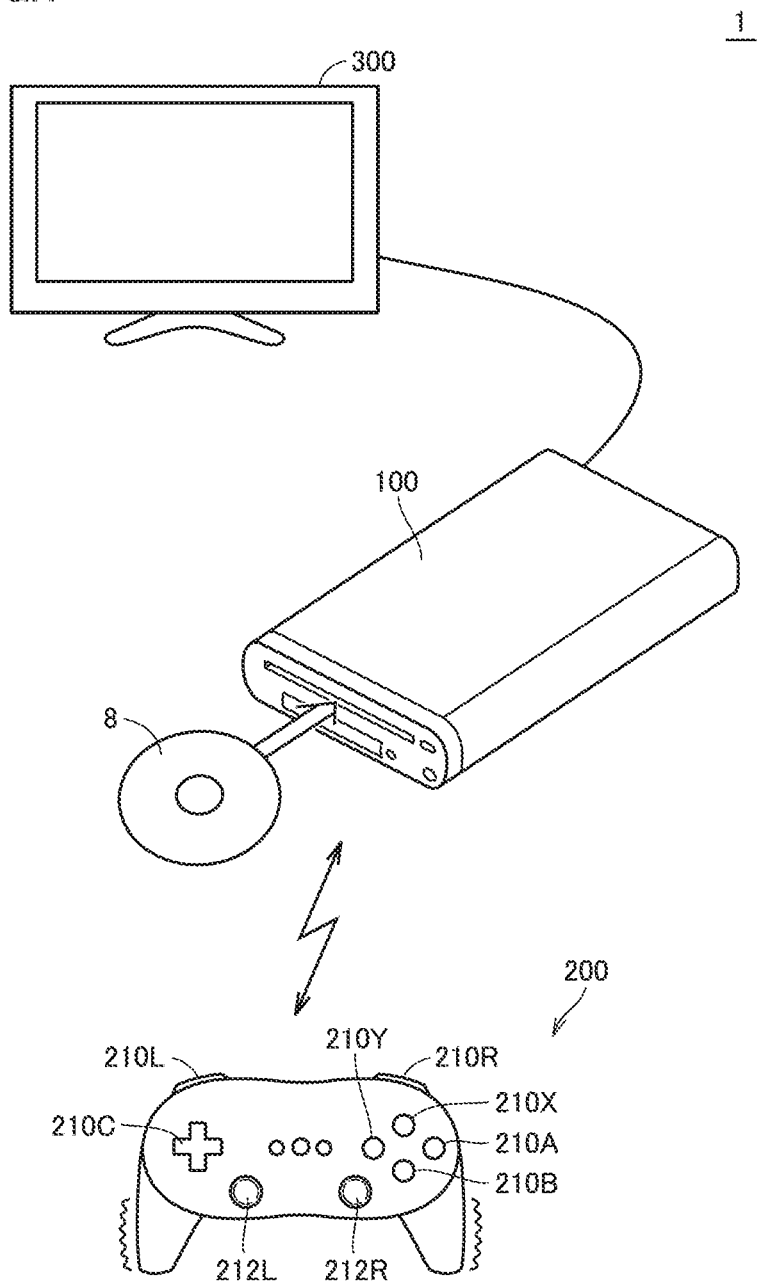
FIG. 1 shows an exemplary illustrative non-limiting drawing illustrating a form of use of a game system according to the present embodiment.

The present embodiment will be described in detail with reference to the drawings. The same or corresponding elements in the drawings have the same reference characters allotted and description thereof will not be repeated.

A configuration including a stationary game device and a controller terminal which vibrates is exemplified as one example of a vibration control system according to the present embodiment. The vibration control system in the subject invention is applied not only to a stationary game system but also to execution of a game with a portable game device or a smartphone being used as a game device. In this case, the portable game device or the smartphone itself can be a "terminal" which vibrates. The vibration control system is applicable to any configuration so long as the system includes an apparatus which generates vibrations.

[A. Apparatus Configuration]

An apparatus configuration involved with a game system according to the present embodiment will initially be described.

(a1: Overall Game System)

One example of a form of use of a game system 1 according to the present embodiment will be described with reference to FIG. 1. Game system 1 includes a processing apparatus 100 and a controller 200 which can wirelessly communicate with processing apparatus 100. Though an example in which one controller 200 wirelessly communicates with processing apparatus 100 is shown for the sake of convenience of description, a plurality of controllers 200 may wirelessly communicate with processing apparatus 100 and a controller of another type in addition to controller 200 may communicate with processing apparatus 100. Radio communication or wired communication may be adopted as means for communication between processing apparatus 100 and a controller. Instead of a dedicated controller 200, a portable game device or a smartphone may be used as a controller.

A display 300 such as a home television receiver is connected to processing apparatus 100. Processing apparatus 100 is an entity which performs various types of processing in game system 1 and it executes an application program and outputs images (which may include still images and moving images) or sound generated as a result of execution to display 300. A menu screen mounted in advance on processing apparatus 100 is also output to display 300. An application program executed in processing apparatus 100 is distributed through a removable storage medium or through the Internet. In the present embodiment, an application program is obtained from an optical recording medium 8 such as a digital versatile disk (DVD).

(a2: Processing Apparatus)

Figure 2:
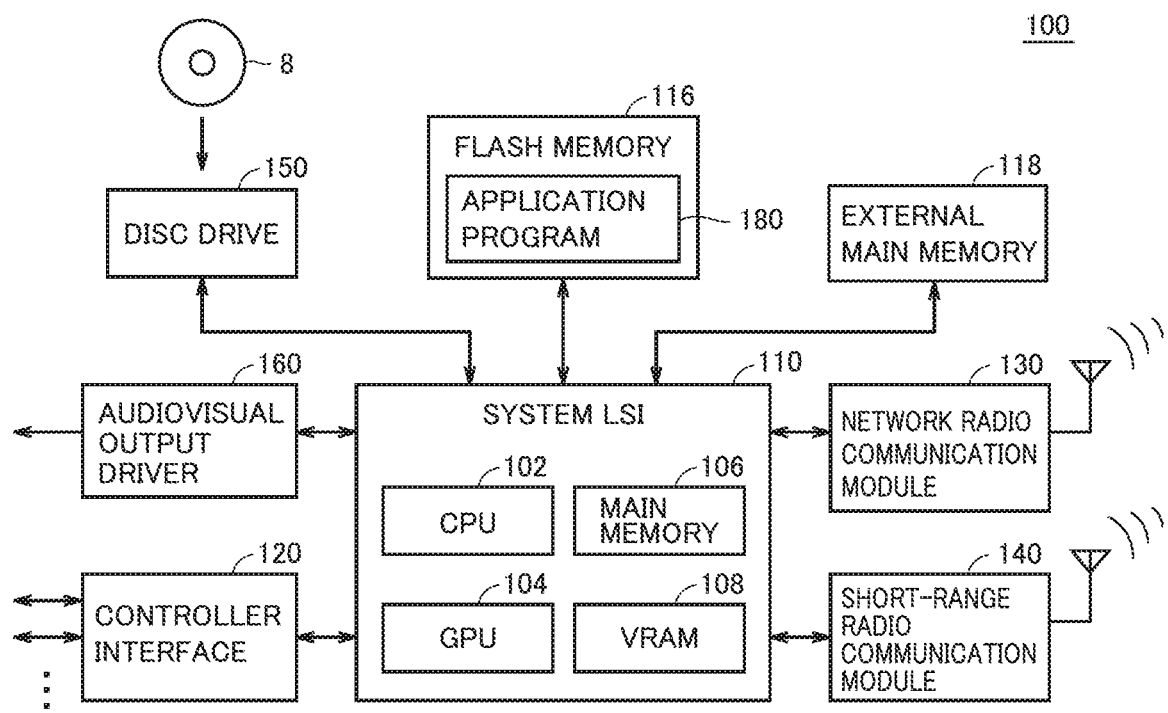
FIG. 2 shows an exemplary illustrative non-limiting drawing illustrating a configuration of a processing apparatus included in the game system in the present embodiment.

A configuration example of processing apparatus 100 included in game system 1 in the present embodiment will be described with reference to FIG. 2. Processing apparatus 100 represents a computer of one type and it is a computer including a system large scale integration (LSI) 110, a flash memory 116, an external memory 118, a controller interface 120, a network radio communication module 130, a short-range radio communication module 140, a disc drive 150, and an audiovisual output driver 160.

System LSI 110 is a processing engine in processing apparatus 100 and includes a central processing unit (CPU) 102, a graphical processing unit (GPU) 104, a main memory 106, and a video random access memory (VRAM) 108. CPU 102 executes a basic system program or an application program. GPU 104 performs processing mainly involved with representation. Main memory 106 functions as a working memory which holds temporary data necessary for execution of a program by CPU 102. VRAM 108 functions as a working memory for showing an image generated in processing by GPU 104. All components included in system LSI 110 do not have to be mounted on a single LSI and some of them may be mounted outside the LSI.

Flash memory 116 is accessible from system LSI 110 and holds a basic system program or an application program in a non-volatile manner. For example, flash memory 116 stores an application program 180 according to the present embodiment. External memory 118 functions as a working memory in coordination with main memory 106 in system LSI 110.

Controller interface 120 includes a connector and a circuit for wired connection of a not-shown controller. Controller interface 120 exchanges a signal (operation information) representing an operation by a user onto the controller with the controller connected through a wire.

Network radio communication module 130 includes various circuits for radio communication with a not-shown access point. Processing apparatus 100 is connected to the Internet through network radio communication module 130. Examples of radio communication schemes adopted by network radio communication module 130 include wireless LAN in conformity with IEEE 802.11n standards and mobile communication such as long term evolution (LTE) and WiMAX®.

Short-range radio communication module 140 includes various circuits for radio communication with controller 200 (FIG. 1). Processing apparatus 100 receives operation information from controller 200 through short-range radio communication module 140. Examples of radio communication schemes adopted by short-range radio communication module 140 include a scheme in conformity with Bluetooth® standards and infrared communication in conformity with infrared data association (IRDA) standards.

A configuration in accordance with each communication scheme is adopted for the communication module. A configuration which is physical integration of the entirety or a part of the two communication modules can also be adopted.

Disc drive 150 reads data from optical recording medium 8 and outputs the read data to system LSI 110. Audiovisual output driver 160 outputs a video signal and an audio signal output from system LSI 110 to display 300.

(a3: Controller)

A configuration example of controller 200 included in game system 1 in the present embodiment will be described with reference to FIG. 3. Controller 200 includes a controller control unit 202, buttons 210, analog sticks 212L and 212R, a vibration portion 220, sensors 230, and a short-range radio communication module 240.

Controller control unit 202 is a processing engine in controller 200 and implemented, for example, by a microcomputer. Controller control unit 202 collects signals (operation information) representing an operation by a user onto buttons 210 and/or analog sticks 212L and 212R and a result of detection by sensors 230 and transmits the signals and the result to processing apparatus 100 through short-range radio communication module 240. Controller control unit 202 drives vibration portion 220 upon receiving a command relating to vibration from processing apparatus 100 (which is hereinafter also referred to as a "vibration command").

Buttons 210 include an A button 210A, a B button 210B, an X button 210X, a Y button 210Y, an L button 210L, an R button 210R, and a cross-shaped button 210C. Each button outputs a signal resulting from a pressing operation by a user to controller control unit 202.

Analog sticks 212L and 212R output operation information including a direction and magnitude in accordance with a direction and an amount of tilt of a stick member and whether or not the stick member has been pressed down to processing apparatus 100.

Vibration portion 220 provides a sensory impulse through vibrations to a user who holds controller 200. Specifically, vibration portion 220 includes an amplifier 212 and a vibrator 214. Amplifier 212 amplifies a vibration command from controller control unit 202 and drives vibrator 214 with the amplified vibration command. In the present embodiment, vibrator 214 having a plurality of resonance frequencies may be adopted. By adopting vibrator 214 having such a plurality of resonance frequencies, a vibratory stimulus can more efficiently be provided to a user through excitation at a frequency in the vicinity of a resonance frequency and various vibratory stimuli can be provided to the user.

Sensors 230 detect information on a motion and/or an attitude of controller 200 and output a result of detection to processing apparatus 100. In the present embodiment, specifically, sensors 230 include an acceleration sensor 232 and an angular speed sensor 234. Acceleration sensor 232 detects magnitude of a linear acceleration along one or more axial directions (typically, directions of three axes orthogonal to one another). Angular speed sensor 234 detects an angular speed around one or more axes (typically, around three axes orthogonal to one another). Any one or both of the acceleration sensor and the angular speed sensor may be mounted on the controller as the sensors.

Short-range radio communication module 240 includes various circuits for radio communication with processing apparatus 100. Controller control unit 202 exchanges data with processing apparatus 100 through short-range radio communication module 240. A radio communication scheme adopted by short-range radio communication module 240 is preferably adapted to a radio communication scheme adopted by short-range radio communication module 140 of processing apparatus 100.

[B. Overview]

Game system 1 according to the present embodiment has a function to effectively provide a sensory impulse through vibrations in accordance with progress of game processing to a user. A function to provide a sensory impulse through vibrations will be described below.

One example of processing for controlling vibration portion 220 in game system 1 according to the present embodiment will be described with reference to FIGS. 4 and 5. For example, such an application as providing a sensory impulse through two types of vibrations to a user in accordance with progress of game processing is assumed. In such a case, a vibration source 1 and a vibration source 2 which generate vibrations are prepared. Time waveforms of vibrations generated by respective vibration sources are synthesized to vibrate vibration portion 220 of controller 200. The vibration source corresponds to a function to output information representing a vibration waveform and it is implemented, for example, by a program which outputs a parameter representing a vibration waveform.

Vibration source 1 corresponds to a first vibration command generation function which generates first vibration data representing a first time waveform and vibration source 2 corresponds to a second vibration command generation function which generates second vibration data representing a second time waveform. Vibration source 1 and vibration source 2 may be implemented on the same program or implemented by different programs.

For example, as shown in FIG. 4, such game processing that a rock object rolls down a slope and collides against an obstacle on the way in a game space is assumed. In such game processing, vibrations generated in response to an event of the rock rolling down the slope (a time waveform of vibrations generated by vibration source 1) and vibrations generated in response to an event of collision against the obstacle (a time waveform of vibrations generated by vibration source 2) are synthesized to provide a time waveform of vibrations for actually vibrating controller 200.

Figure 5:
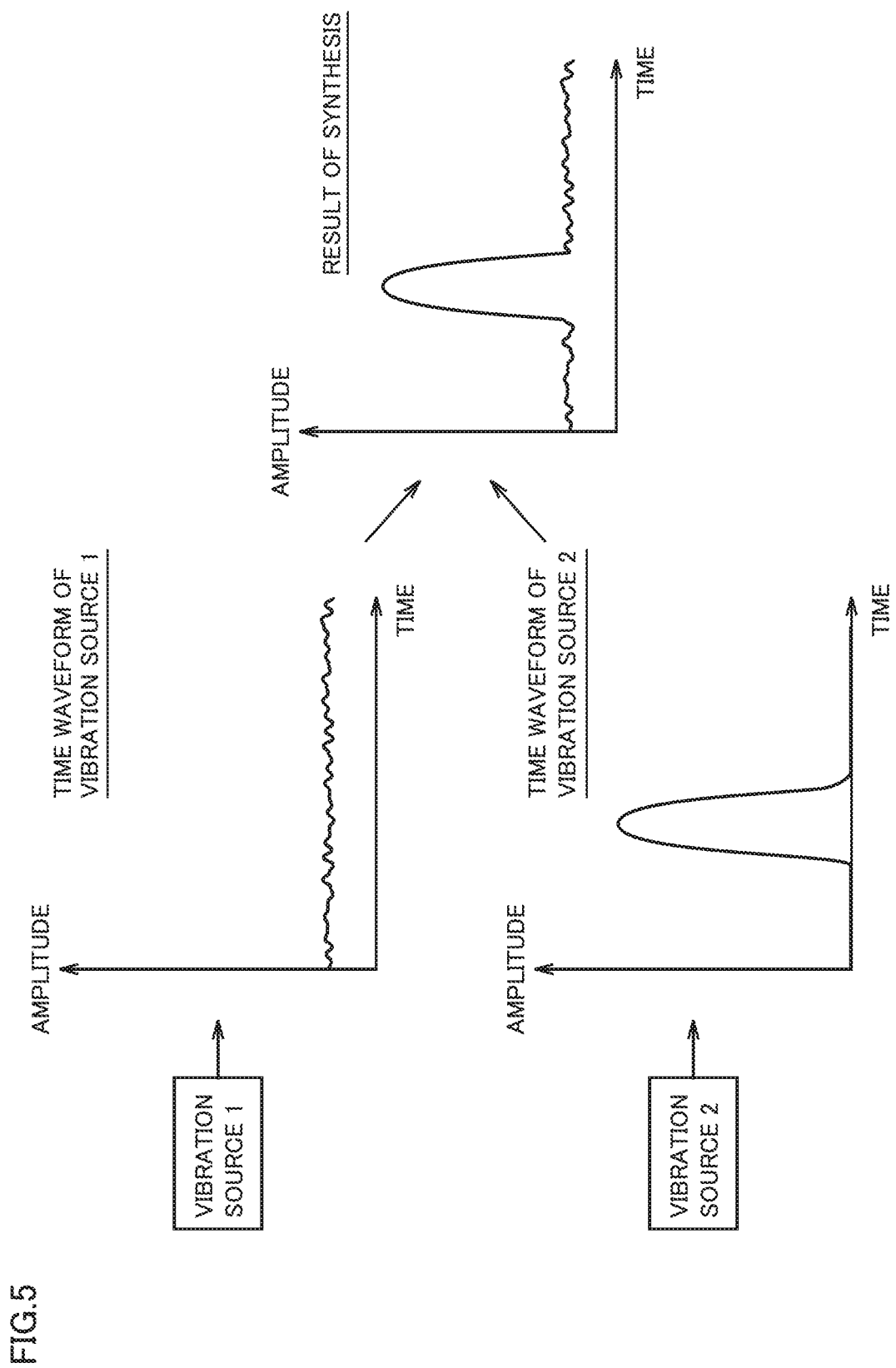

As shown in FIG. 5, a time waveform small in absolute magnitude of an amplitude is assumed as a time waveform of vibrations generated by vibration source 1. A time waveform large in maximum value (peak value) of an amplitude and abrupt in change over time in amplitude (that is, high in main frequency component) is assumed as a time waveform of vibrations generated by vibration source 2.

In game system 1 according to the present embodiment, one or more vibration sources are prepared and vibration waveforms generated by the vibration sources in response to an event are synthesized to vibrate controller 200. When amplitudes of vibrations are simply added and output, an amplitude of vibrations resulting from synthesis may exceed an amplitude reproducible in controller 200 (that is, maximum displacement of the vibrator). In a range beyond such an amplitude, variation in vibrations cannot be expressed and consequently an expected vibratory stimulus cannot be provided to a user.

In order to avoid such a situation, time waveforms of vibrations from prepared vibration sources should be adjusted so as not to excessively be great. Since each vibration source outputs a time waveform of vibrations in response to a corresponding event, it is difficult to exactly expect in advance how vibrations are combined in actual game processing.

In order to address such a problem, by using a synthesis method according to the present embodiment, a vibration source can be set without combined vibrations being taken into account each time, and an appropriate vibratory stimulus in accordance with an event can be provided to a user.

Game system 1 according to the present embodiment provides a function to appropriately synthesize signals from a plurality of vibration sources and provide an appropriate vibratory stimulus in accordance with progress of a game to a user based on a result of synthesis.

[C. Method of Designating Vibration Waveform]

A method of designating a vibration waveform in game system 1 according to the present embodiment will initially be described. Each vibration waveform represents a time waveform (a time axis waveform) of vibrations corresponding to displacement of vibrator 214 (see FIG. 3) of vibration portion 220. A method of designating a vibration waveform typically includes designation with a time domain and designation with a frequency domain. Each designation method will be described below.

(c1: Designation with Time Domain)

Figure 6:
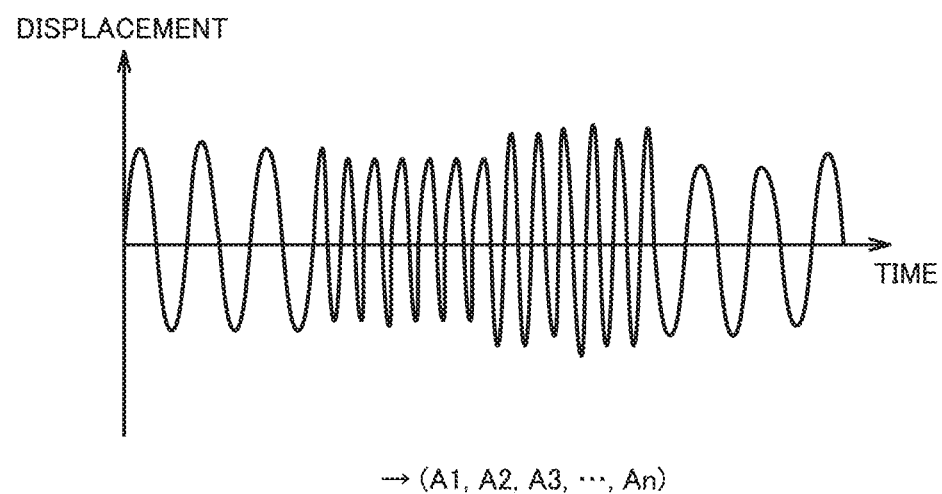
FIG. 6 shows an exemplary illustrative non-limiting drawing illustrating a method of designating a vibration waveform with a time domain in the game system according to the present embodiment.

A method of designating a vibration waveform with a time domain in game system 1 according to the present embodiment will be described with reference to FIG. 6. When any vibration waveform (that is, a time waveform of vibrations) is designated, change over time in value (for example, a voltage value) corresponding to displacement (an amount of movement from a reference position of a vibration motor or a vibrator) every sampling period (for example, several ten μsecs. to several thousand μsecs.) of the vibration waveform can be designated, for example, as a data aggregate (A1, A2, A3, . . . , and An). By varying displacement over time based on the data aggregate, a target time waveform of a vibration waveform can be reproduced. The data aggregate corresponds to vibration data representing a designated time waveform of vibrations.

(c2: Designation with Frequency Domain)

Figure 7:
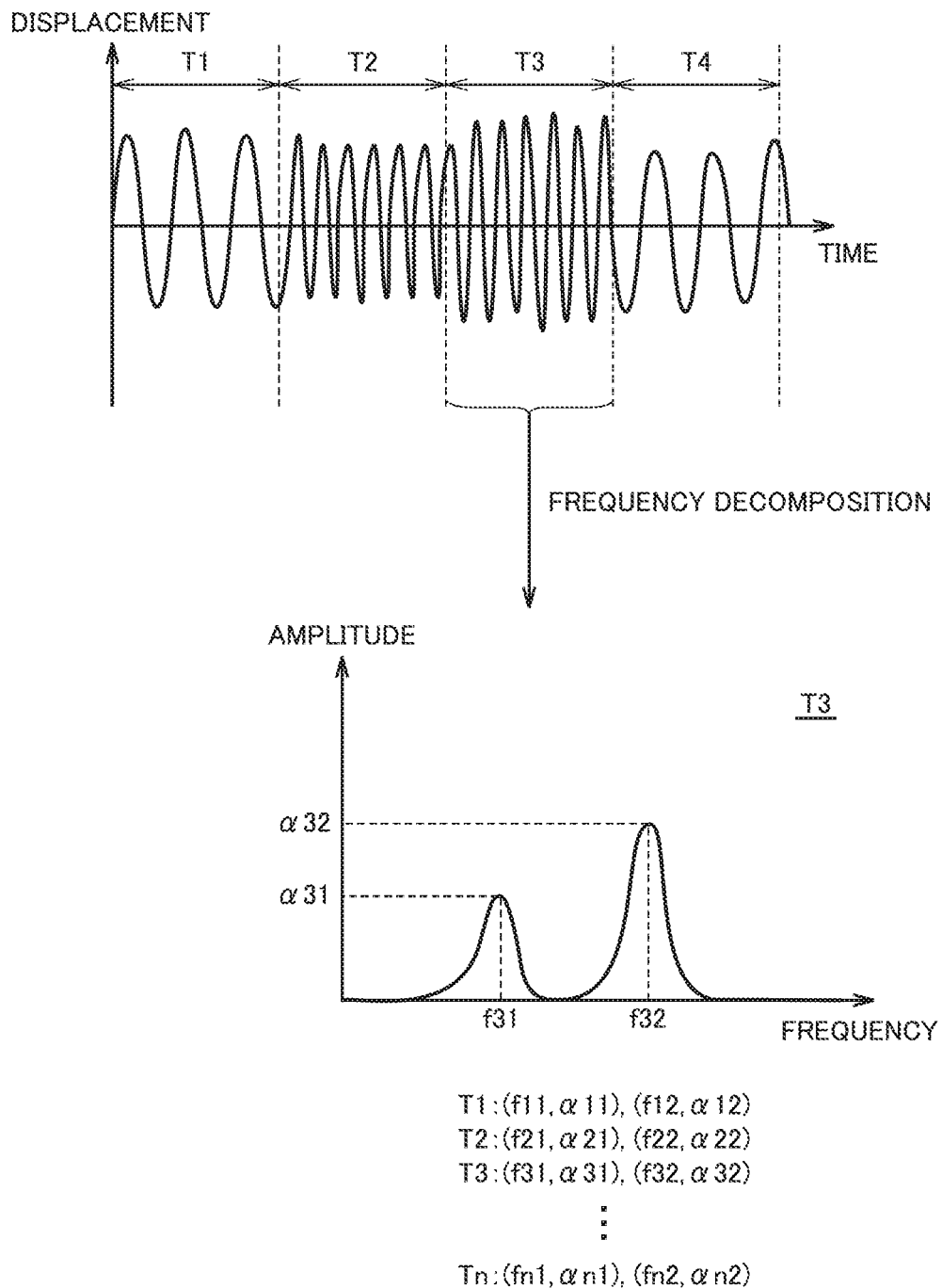
FIG. 7 shows an exemplary illustrative non-limiting drawing illustrating a method of designating a vibration waveform with a frequency domain in the game system according to the present embodiment.

A method of designating a vibration waveform with a frequency domain in game system 1 according to the present embodiment will be described with reference to FIG. 7. When any time waveform of vibrations is designated, the time waveform is divided into unit sections (that is, sampling sections) T1, T2, T3, . . . of a prescribed duration (for example, 5 msecs. to several ten msecs.) and a time waveform in each unit section is subjected to frequency decomposition. Only a main component in a combination of a frequency component and an amplitude included in a result of frequency decomposition is extracted and defined as a value representing each unit section.

By adopting such a technique, a target vibration waveform can be designated as data aggregates {(f11, α11), (f12, α12)}, {(f21, α21), (f22, α22)}, {(f31, α31), (f32, α32)}, . . . , and {(fn1, αn1), (fn2, αn2)} each consisting of a combination of a frequency f and an amplitude α. A target vibration waveform can be reproduced by generating a vibration waveform based on information on corresponding frequency and amplitude for each sampling period based on the data aggregates. The data aggregate corresponds to vibration data representing a designated time waveform of vibrations. In the example shown in FIG. 7, two main components included in a result of frequency decomposition are extracted and these two main components express a vibration waveform of a corresponding unit section. As shown in FIG. 7, a waveform including two particularly characteristic frequencies would be able to represent a substantially desired waveform with two main components.

Though an example in which a target vibration waveform is designated with one combination or two combinations of a value representing a frequency and a value representing an amplitude has been shown, limitation thereto is not intended and more combinations of a value representing a frequency and a value representing an amplitude may be used to designate a vibration waveform. In game system 1 according to the present embodiment, vibrator 214 arranged in controller 200 has two resonance frequencies and therefore a vibration waveform including two frequency components may be used in accordance with the two resonance frequencies. Instead of obtaining data on a frequency and an amplitude by subjecting a time waveform of vibrations to frequency decomposition, a frequency and an amplitude may directly be designated for use as data representing a time waveform represented by the designated frequency and amplitude.

Each vibration waveform may represent a time waveform including a low frequency component and a high frequency component in correspondence with a resonance frequency of vibrator 214, and may be defined by a set of a frequency and an amplitude for designating a low frequency component and a set of a frequency and an amplitude for designating a high frequency component. In this case, a frequency of a low frequency component and a frequency of a high frequency component constituting the first vibration waveform and a frequency of a low frequency component and a frequency of a high frequency component constituting the second vibration waveform are preferably set to correspond to any of a plurality of resonance frequencies of vibrator 214. A frequency of each time waveform included in a vibration pattern may thus be set in accordance with a resonance frequency of a vibrator.

For the sake of convenience of description, a method of designating a vibration waveform with a frequency domain will mainly be described below by way of example. In the description below, processing at the time when a combination of a frequency and an amplitude representing a time waveform for vibrating a terminal (controller 200 in an example below) is adopted as vibration data representing the time waveform will be described. Vibration data exhibits a time waveform corresponding to a drive signal for driving vibrator 214 of vibration portion 220. One or more combinations of a frequency and an amplitude may also be referred to as a "vibration pattern." The "vibration pattern" herein is a concept which may encompass both of a time waveform of designated vibrations and vibration data defining the same. A method of designating a vibration waveform with a time domain is obviously also similarly applicable.

[D. Method of Synthesizing Vibration Patterns]

A method of synthesizing vibration patterns in game system 1 according to the present embodiment will now be described. A method of synthesizing vibration patterns typically includes a selection scheme and an addition scheme. Each synthesis method will be described below.

(d1: Selection Scheme)

In the selection scheme of the method of synthesizing vibration patterns according to the present embodiment, any one of input vibration patterns is selected and output every prescribed period. In one embodiment, any one of two vibration patterns is selectively output every prescribed period based on an amplitude of a time waveform represented by one vibration pattern and an amplitude of the other time waveform represented by the other vibration data. More specifically, when first vibration data (vibration pattern) and second vibration data (vibration pattern) generated by vibration sources are input, vibration data representing a time waveform greater in amplitude is selected every prescribed period based on an amplitude of the first time waveform represented by the first vibration data and an amplitude of the second time waveform represented by the second vibration data.

The method of synthesizing vibration patterns in accordance with the selection scheme according to the present embodiment will be described with reference to FIG. 8. For example, a vibration pattern 1 and a vibration pattern 2 are input. Vibration pattern 1 designates weak and continual vibrations so to speak and vibration pattern 2 designates strong and short vibrations so to speak.

A synthesis module determines which vibration pattern is greater in amplitude every prescribed period (for example, 5 msecs. to several ten msecs.) and selects and outputs a vibration pattern greater in amplitude. A synthesized pattern is generated with signals output every prescribed period. Typically, the synthesis module compares input vibration patterns at timing of start of each period and determines a vibration pattern to be output. Then, determination of the output vibration pattern is maintained until a next period comes. In this case, a part of a vibration pattern which is not selected is discarded.

The "prescribed period" here means a period in which various types of processing including determination processing as described above are performed and a length thereof and timing to start and quit the period may be set in association with a vibration waveform. When displacement of an input vibration waveform is defined every predetermined sampling period, the prescribed period is preferably set to a period as long as the sampling period or an integer multiple of the sampling period.

Figure 8:
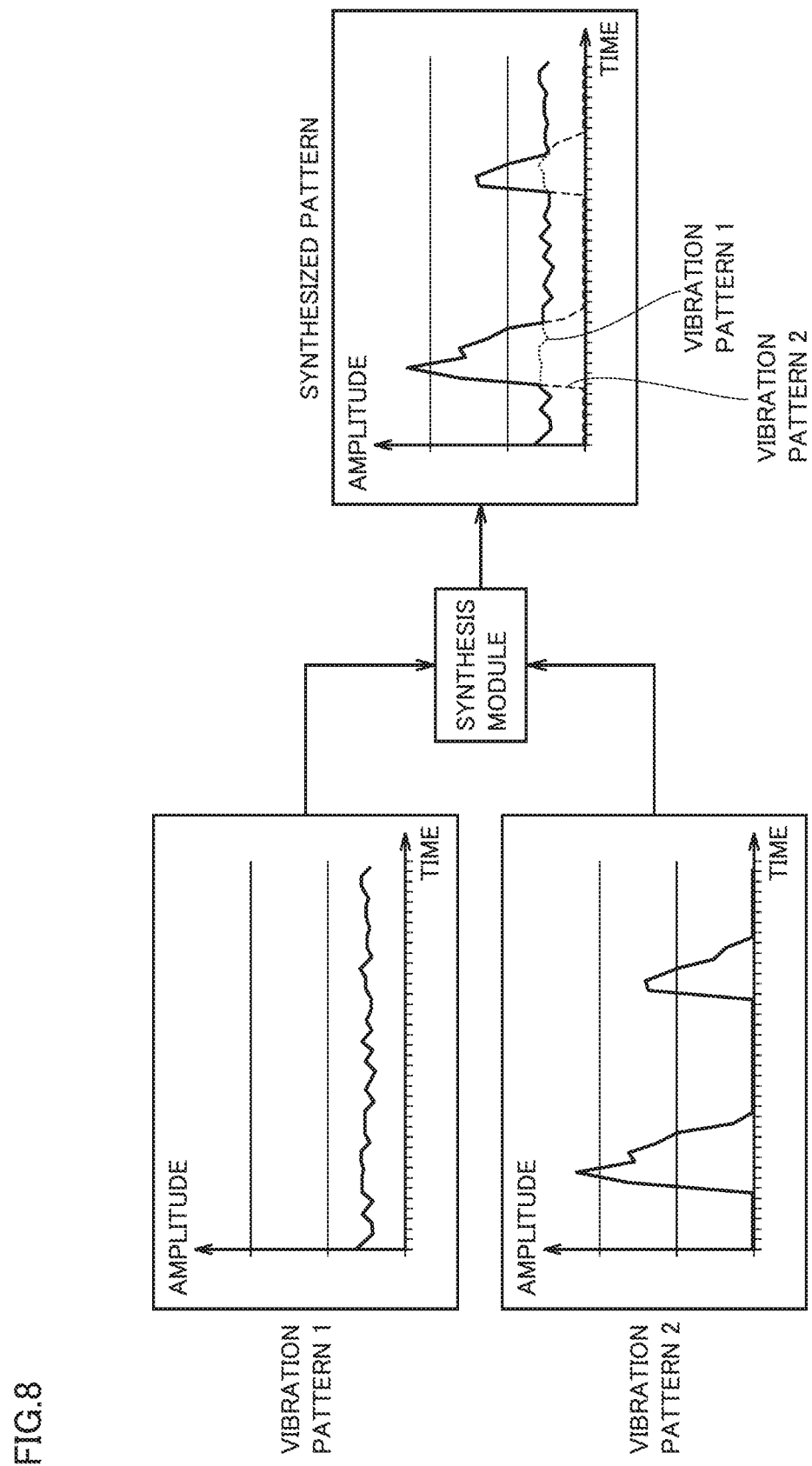
FIG. 8 shows an exemplary illustrative non-limiting drawing illustrating a method of synthesizing vibration patterns in accordance with a selection scheme according to the present embodiment.

By adopting such a selection scheme, a user can perceive strong and short vibrations contained in weak and continual vibrations designated by vibration pattern 1 in FIG. 8.

Figure 9:
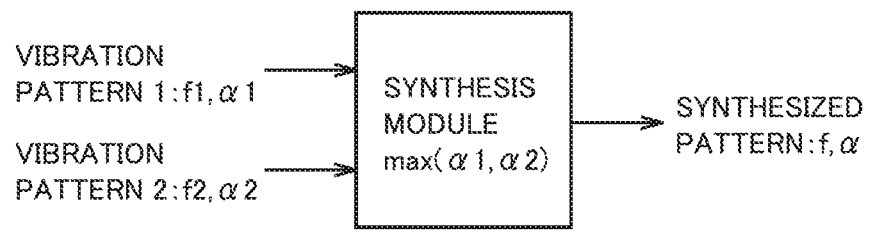
FIG. 9 shows an exemplary illustrative non-limiting drawing illustrating mounting of a synthesis method in accordance with the selection scheme according to the present embodiment.

A mount example of the synthesis method in accordance with the selection scheme according to the present embodiment will be described with reference to FIG. 9. A mount example in which each of vibration patterns 1 and 2 is designated by one combination of a frequency and an amplitude is shown. It is assumed that a frequency f1 and an amplitude α1 designating vibration pattern 1 and a frequency f2 and an amplitude α2 designating vibration pattern 2 are updated every prescribed period.

The synthesis module compares amplitude α1 of input vibration pattern 1 and amplitude α2 of vibration pattern 2 with each other in each prescribed period and selects a vibration pattern greater in value thereof as a valid output. The synthesis module outputs frequency f and amplitude α designating any one vibration pattern in accordance with a result of output of a function max(α1, α2) in every prescribed period.

Frequency f1 of vibration pattern 1 and frequency f2 of vibration pattern 2 are not taken into account and only an amplitude of each vibration pattern is compared. Thus, in the selection scheme, regardless of whether frequency f1 of a time waveform represented by vibration pattern 1 and frequency f2 of a time waveform of vibration pattern 2 are the same or different, vibration data representing a time waveform greater in amplitude is selected. By adopting such a configuration, determination processing can be more simplified.

Since a vibration pattern is represented by a combination of values of a frequency and an amplitude, strength of vibration can be compared based on comparison of an amplitude without performing additional processing. By making comparison in accordance with a sampling period with such a method, an amplitude in a prescribed period is represented by one parameter and thus comparison can be facilitated.

Another mount example of the synthesis method in accordance with the selection scheme according to the present embodiment will be described with reference to FIGS. 10(A) and (B). FIGS. 10(A) and (B) shows a mount example in which each of vibration patterns 3 and 4 is designated by two combinations of a combination of a frequency and an amplitude in a low frequency band and a combination of a frequency and an amplitude of a high frequency. Vibration pattern 3 is designated by a frequency f3L and an amplitude α3L on a low frequency side and a frequency f3H and an amplitude α3H on a high frequency side. Vibration pattern 4 is designated by a frequency f4L and an amplitude α4L on the low frequency side and a frequency f4H and an amplitude α4H on the high frequency side.

Thus, the first vibration command generation function representing one vibration source simultaneously generates a plurality of pieces of vibration data including the first vibration data (in this example, a combination of values representing a first frequency (f3L) and a first amplitude (α3L) and a combination of values representing a second frequency (f3H) and a second amplitude (α3H)), and the second vibration command generation function representing another vibration source simultaneously generates a plurality of pieces of vibration data including the second vibration data (in this example, a combination of values representing a third frequency (f4L) and a third amplitude (α4L) and a combination of values representing a fourth frequency (f4H) and a fourth amplitude (α4H)).

Thus, the vibration sources generate vibration pattern 3 by combining first vibration data (frequency f3H/amplitude α3H) and second vibration data (frequency f3L/amplitude α3L) and vibration pattern 4 by combining third vibration data (frequency f4H/amplitude α4H) and fourth vibration data (frequency f4L/amplitude α4L). A frequency (frequency f4H) of a time waveform of the third vibration data is set to be lower than a frequency (frequency f3H) of a time waveform of the first vibration data, and a frequency (frequency f4L) of a time waveform of the fourth vibration data is set to be lower than a frequency (frequency f3L) of a time waveform of the second vibration data.

It is assumed that a frequency and an amplitude designating these vibration patterns are updated every prescribed period. A combination of a value representing a frequency and a value representing an amplitude every prescribed period is generated as vibration pattern 3 (a combination of the first vibration data (a waveform of frequency f3L and amplitude α3L) and the second vibration data (a waveform of frequency f3H and amplitude α3H)) and another combination of a value representing a frequency and a value representing an amplitude every prescribed period is generated as vibration pattern 4 (a combination of the third vibration data (a waveform of frequency f3L and amplitude α3L) and the fourth vibration data (a waveform of frequency f4H and amplitude α4H)).

In such a case, two methods as below are possible depending on which amplitude is to be compared.

FIG. 10A shows a method of independently determining a high frequency side and a low frequency side. Referring to FIG. 10A, amplitude α3L on the low frequency side of vibration pattern 3 and amplitude α4L on the low frequency side of vibration pattern 4 (that is, a function max(α3L, α4L)) are compared with each other, and an amplitude α4H on the high frequency side of vibration pattern 3 and amplitude α3H on the high frequency side of vibration pattern 4 (that is, a function max(α3H, α4H)) are compared with each other, and information representing a greater amplitude in each comparison (a frequency fL and an amplitude αL on the low frequency side and a frequency fH and an amplitude αH on the high frequency side) is output as a synthesized pattern.

Thus, when a plurality of pieces of vibration data generated by the first vibration command generation function representing one vibration source and a plurality of pieces of vibration data generated by the second vibration command generation function representing another vibration source are input, the plurality of pieces of vibration data including the vibration data representing a time waveform greatest in amplitude are selected based on an amplitude of a time waveform represented by respective pieces of vibration data among the plurality of pieces of vibration data generated by the first vibration command generation function and the plurality of pieces of vibration data generated by the second vibration command generation function. When vibration pattern 3 including the first vibration data and the third vibration data generated from one vibration source and vibration pattern 4 including the second vibration data and the fourth vibration data generated by another vibration source are input, vibration data representing a time waveform greater in amplitude is selected every prescribed period based on amplitude $\alpha 3H$ of the first time waveform represented by the first vibration data and amplitude $\alpha 4H$ of the second time waveform represented by the second vibration data. Similarly, vibration data representing a time waveform greater in amplitude is selected every prescribed period based on amplitude $\alpha 3L$ of the third time waveform represented by the second vibration data and amplitude $\alpha 4L$ of the fourth time waveform represented by the fourth vibration data.

By adopting the selection scheme shown in FIG. 10A, a component greater in amplitude at each frequency is selected from among frequency components contained in each of vibration patterns 3 and 4 so that a more characteristic vibratory stimulus can be provided to a user.

Only an amplitude of each vibration pattern may be compared without taking into account whether frequency f3L on the low frequency side of vibration pattern 3 and frequency f4L on the low frequency side of vibration pattern 4 are the same or different and whether frequency f3H on the high frequency side of vibration pattern 3 and frequency f4H on the high frequency side of vibration pattern 4 are the same or different.

FIG. 10B shows a method of collectively determining the high frequency side and the low frequency side. Referring to FIG. 10B, an amplitude resulting from synthesis of amplitude $\alpha 3L$ on the low frequency side and amplitude $\alpha 3H$ on the high frequency side of vibration pattern 3 and an amplitude resulting from synthesis of amplitude $\alpha 4L$ on the low frequency side and amplitude $\alpha 4H$ on the high frequency side of vibration pattern 4 (that is, a function $\max(\alpha 3L+\alpha 3H, \alpha 4L+\alpha 4H)$) are compared with each other, and a vibration pattern representing a greater amplitude in comparison is output as a synthesized pattern. Any vibration pattern is selectively output based on a value $(\alpha 3L+\alpha 3H)$ calculated from the first amplitude $(\alpha 3L)$ and the second amplitude $(\alpha 3H)$ contained in vibration pattern 3 and a value $(\alpha 4L+\alpha 4H)$ calculated from the third amplitude $(\alpha 4L)$ and the fourth amplitude $(\alpha 4H)$ contained in vibration pattern 4.

Thus, when a plurality of pieces of vibration data including the first vibration data generated by the first vibration command generation function representing one vibration source and a plurality of pieces of vibration data including the second vibration data generated by the second vibration command generation function representing another vibration source are input, a plurality of pieces of vibration data greater in total of amplitudes is selected every prescribed period based on a total of amplitudes represented by the plurality of pieces of vibration data generated by the first vibration command generation function and a total of amplitudes represented by the plurality of pieces of vibration data generated by the second vibration command generation function.

In the selection scheme shown in FIG. 10B, an amplitude of an input vibration pattern may be evaluated as being weighted by a frequency. Since a human is generally more sensitive to vibrations on the low frequency side, for example, an amplitude on the low frequency side may be multiplied by a weight coefficient (for example, b>1) greater than that for an amplitude on the high frequency side. In this case, which amplitude is greater may be determined by making use of a function $\max(b \times \alpha 3L+\alpha 3H, b \times \alpha 4L+\alpha 4H)$.

By adopting the selection scheme shown in FIG. 10B, a vibration pattern greater in amplitude as a whole is selected from vibration patterns 3 and 4, and hence a vibratory stimulus can be provided to a user while characteristics of input vibration patterns as a whole are maintained.

Only an amplitude of each vibration pattern may be compared without taking into account whether frequency f3L on the low frequency side of vibration pattern 3 and frequency f4L on the low frequency side of vibration pattern 4 are the same or different and whether frequency f3H on the high frequency side of vibration pattern 3 and frequency f4H on the high frequency side of vibration pattern 4 are the same or different.

A prescribed number of frequency components may be selected from frequency components contained in vibration patterns 3 and 4 based on magnitude of each amplitude. Two greatest frequency components of amplitude $\alpha 3L$ on the low frequency side of vibration pattern 3, amplitude $\alpha 3H$ on the high frequency side of vibration pattern 3, amplitude $\alpha 4L$ on the low frequency side of vibration pattern 4, and amplitude $\alpha 4H$ on the high frequency side of vibration pattern 4 may be extracted and output as a synthesized pattern.

(d2: Addition Scheme)

The method of synthesizing vibration patterns in accordance with the addition scheme according to the present embodiment will be described with reference to FIG. 11. FIG. 11 shows an example in which a vibration pattern 5 and a vibration pattern 6 are input. Vibration patterns 5 and 6 exhibit characteristics of change over time similar to each other.

The synthesis module adds amplitudes of input vibration patterns every prescribed period and then outputs the added amplitudes. A synthesized pattern is a result of combination of vibration pattern 5 and vibration pattern 6 with each other on a time axis.

By adopting such an addition scheme, for example, in such a situation that a plurality of vibrations of a similar type may frequently be superimposed on one another, a user can perceive the number itself of vibrations superimposed on one another.

A mount example of the synthesis method in accordance with the addition scheme according to the present embodiment will be described with reference to FIG. 12. FIG. 12 shows a mount example in which each of vibration patterns 7 and 8 is designated by two combinations of a frequency and an amplitude. Vibration pattern 7 is designated by a frequency f7L and an amplitude $\alpha 7L$ on the low frequency side and a frequency f7H and an amplitude $\alpha 7H$ on the high frequency side. Vibration pattern 8 is designated by a frequency f8L and an amplitude $\alpha 8L$ on the low frequency side and a frequency f8H and an amplitude $\alpha 8H$ on the high frequency side. It is assumed that a frequency and an amplitude designating the vibration pattern are updated every prescribed period.

The synthesis module outputs a synthesized pattern (frequency fL and amplitude $\alpha L$ on the low frequency side and frequency fH and amplitude $\alpha H$ on the high frequency side) upon receiving inputs of vibration patterns 7 and 8.

Amplitude $\alpha L$ on the low frequency side and amplitude $\alpha H$ on the high frequency side of the synthesized pattern may be calculated by adding amplitudes on the low frequency side and amplitudes on the high frequency side of vibration patterns 7 and 8. Amplitude αL on the low frequency side of the synthesized pattern=αL7+αL8 and amplitude αH on the high frequency side of the synthesized pattern=αH7+αH8 can be calculated.

There are four frequencies in total designating input vibration patterns 7 and 8, whereas there are two frequencies of output synthesized patterns. Therefore, an input and an output should be matched with each other. Three types as below can be assumed as a scheme for calculating a frequency of a synthesized pattern.

(1) Scheme of Adopting Frequency of Vibration Pattern Greatest in Amplitude

In this scheme, on the low frequency side, amplitude α7L on the low frequency side of vibration pattern 7 and amplitude α8L on the low frequency side of vibration pattern 8 are compared with each other and a frequency greater in amplitude is adopted. On the high frequency side, amplitude α7H on the high frequency side of vibration pattern 7 and amplitude α8H on the high frequency side of vibration pattern 8 are compared with each other and a frequency greater in amplitude is adopted.

(2) Scheme of Adopting Average Value of Frequencies of Input Vibration Patterns

In this scheme, on the low frequency side, an average value of frequency f7L on the low frequency side of vibration pattern 7 and frequency f8L on the low frequency side of vibration pattern 8 ((f7L+f8L)/2) is calculated as frequency fL on the low frequency side of the synthesized pattern, and on the high frequency side, an average value of frequency f7H on the high frequency side of vibration pattern 7 and frequency f8H on the high frequency side of vibration pattern 8 ((f7H+f8H)/2) is calculated as frequency fH on the high frequency side of the synthesized pattern.

An arithmetic mean or a geometric mean may be used as a method of calculating an average value. Though the geometric mean rather than the arithmetic mean is preferably used as an average value of frequencies, the arithmetic mean may be used from a point of view of reduced load on processing.

(3) Scheme of Calculation by Weighting Frequency of Input Vibration Pattern with Amplitude In this scheme, frequencies on the low frequency side and the high frequency side are calculated based on a weighted average in accordance with each amplitude of an input vibration pattern. Specifically, frequency fL on the low frequency side of the synthesized pattern=(α7L·f7L+α8L·f8L)(α7L+α8L) and frequency fH on the high frequency side of the synthesized pattern=(α7H·f7H+α8H·f8H)(α7H+α8H) are calculated.

When an input vibration pattern is designated with a frequency domain, a frequency defining a synthesized pattern after addition can be determined with the use of the method as described above. An arithmetic mean or a geometric mean may be made use of as a method of calculating an average value. Though the geometric mean rather than the arithmetic mean is preferably used as an average value of frequencies, the arithmetic mean may be used from a point of view of reduced load on processing. By adopting such a method, the number of combinations of a frequency component and an amplitude defining an output synthesized pattern is not increased and internal processing can be more efficient.

(d3: Selection of Processing)

When an example in which the synthesis modules shown in FIGS. 9, 10A, 10B, and 12 are mounted as program modules (or libraries) is considered, preferably, the synthesis modules are configured as program modules identical in interface and processing is switchable as appropriate with any option switch or command.

When the synthesis module is mounted as a program module, in addition to an interface defining an input vibration pattern as shown in FIGS. 9, 10A, 10B, and 12, an interface for selecting any of the selection scheme and the addition scheme described above is provided. Then, in the selection scheme, an interface for selecting a method of evaluating a selected vibration pattern may be provided, and in the addition scheme, an interface for selecting a method of calculating a frequency of a synthesized pattern may be provided.

(d4: Multiple-Stage Scheme)

Figure 13:
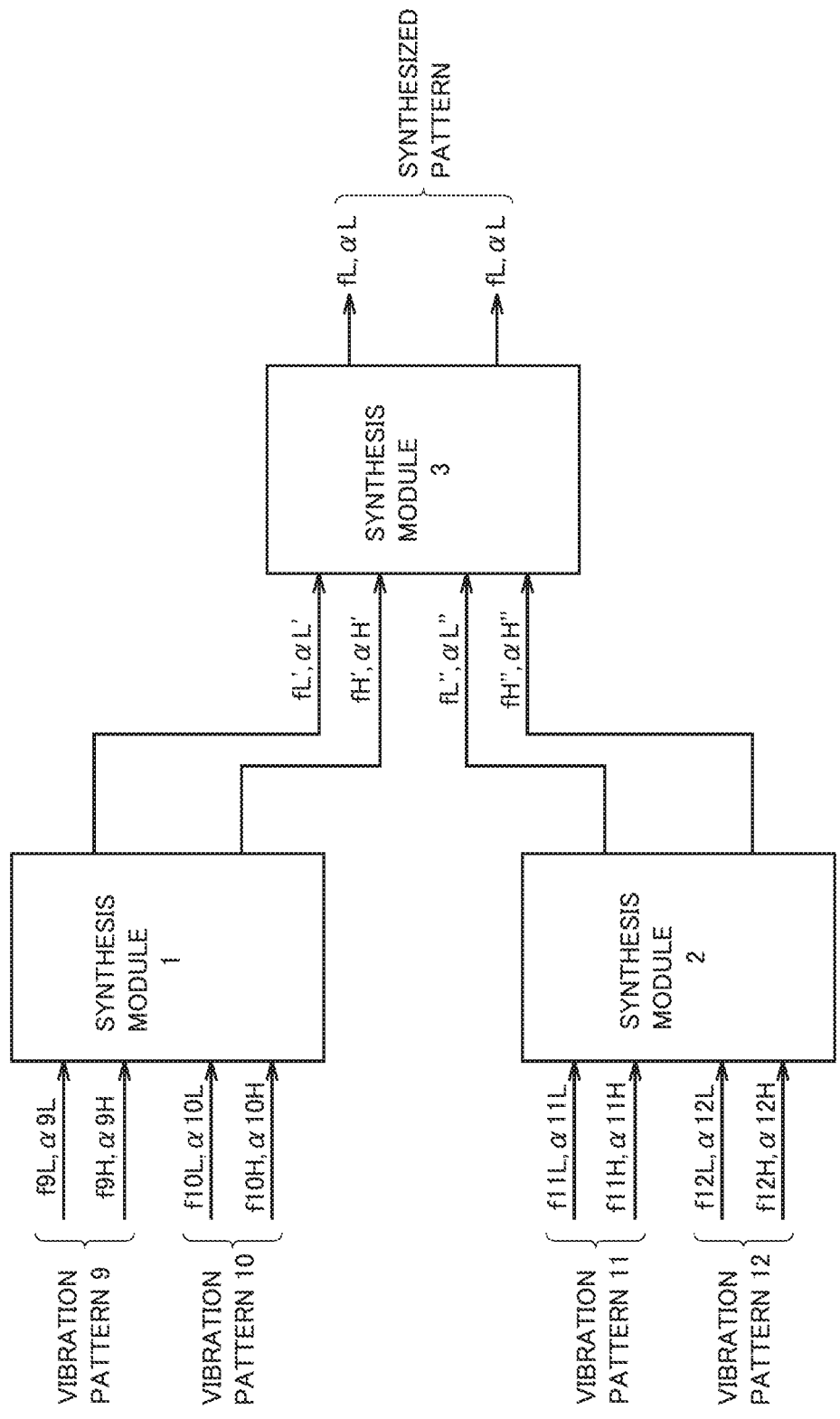
FIG. 13 shows an exemplary illustrative non-limiting drawing illustrating a configuration in which synthesis modules are connected in multiple stages according to the present embodiment.

The synthesis modules shown in FIGS. 9, 10A, 10B, and 12 may be connected to one another. FIG. 13 shows a configuration example in which the synthesis modules according to the present embodiment are connected in multiple stages. Referring to FIG. 13, for example, a processing system in which four vibration patterns 9 to 12 are input and one synthesized pattern is output is assumed. In such a case, two synthesis modules are arranged in a preceding stage, two vibration patterns 9 and 10 are input to one synthesis module (a synthesis module 1), and two vibration patterns 11 and 12 are input to the other synthesis module (a synthesis module 2).

Synthesis module 1 outputs a result of synthesis of vibration patterns 9 and 10 (a frequency fL' and an amplitude αL' on the low frequency side and a frequency and an amplitude αH' on the high frequency side) and synthesis module 2 outputs a result of synthesis of vibration patterns 11 and 12 (a frequency fL" and an amplitude αL" on the low frequency side and a frequency fH" and an amplitude αH" on the high frequency side). The result of synthesis is input to yet another synthesis module (a synthesis module 3). Synthesis module 3 outputs a final synthesized pattern (frequency fL and amplitude αL on the low frequency side and frequency fH and amplitude αH on the high frequency side) by synthesizing results of synthesis from the synthesis modules.

Any number of synthesis modules may be coupled in series and/or in parallel without being limited to an arrangement example shown in FIG. 13.

(d5: Application)

By adopting a technique to synthesize vibration patterns according to the present embodiment as described above, vibration patterns different in type from each other are synthesized in any application so that a vibratory stimulus can be provided to a user as desired in the application.

In an example of such an application, a rock object rolling down a slope as shown in FIG. 4 described above is expressed with weak and continual vibration patterns and collision of the object with an obstacle on the way is expressed with strong and short vibration patterns. In such a case, each vibration pattern is input to the synthesis module according to the present embodiment in response to occurrence of an event so that a vibratory stimulus can be provided to a user without losing the meaning expressed by each vibration pattern.

Alternatively, engine sound generated at the time when a user operates a user character in a game space and the user character travels on a motor bicycle is expressed with weak and continual first vibration patterns and a state at the time when the motor bicycle collides against or rides over some kind of obstacle during travel is expressed with strong and short second vibration patterns. In such a case as well, as described above, the first vibration patterns are generated while a user character travels in response to an operation by the user, and the second vibration patterns are generated at the timing of collision against or riding over some kind of obstacle during travel. These vibration patterns are input to the synthesis modules as described above. By making use of a synthesized output from the synthesis modules, the user can perceive a vibratory stimulus generated in response to jumping without the vibratory stimulus being buried in weak and continual vibratory stimuli generated during travel of the user character.

(d6: Modification)

Though an example in which an amplitude is adopted as a selection criterion has been described, selection may be made based on displacement in waveform (an instantaneous value). As an amplitude is greater, greater displacement is exhibited. Therefore, a vibration pattern greater in amplitude can indirectly be selected by selecting a vibration pattern based on displacement (an instantaneous value).

[E. Functional Configuration]

Figure 14:
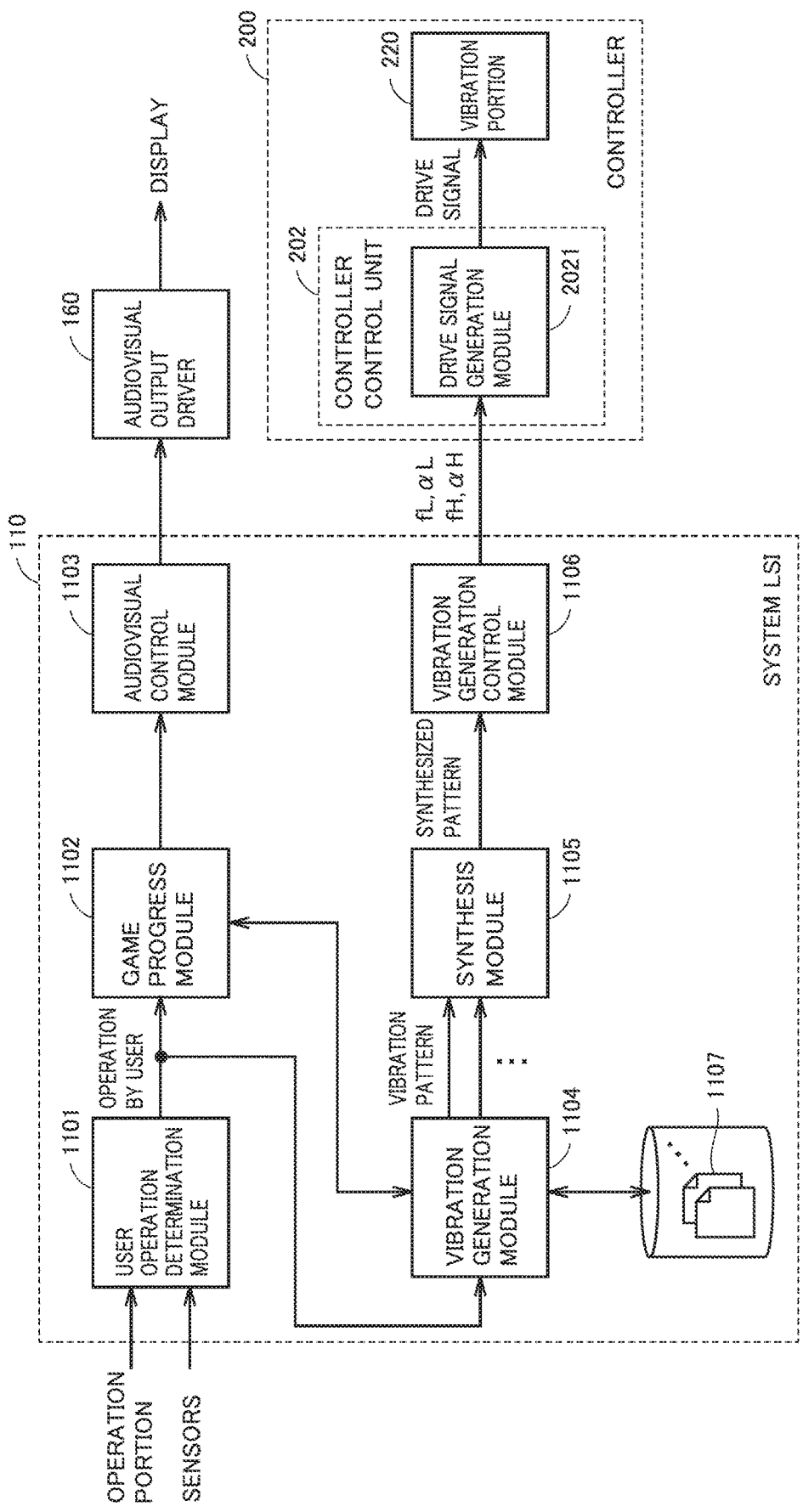
FIG. 14 shows an exemplary illustrative non-limiting block diagram illustrating a main part of a functional configuration mounted on the game system according to the present embodiment.

A main part of a functional configuration mounted on the game system according to the present embodiment will now be described with reference to FIG. 14.

As an application program is executed in system LSI 110 of processing apparatus 100, a user operation determination module 1101, a game progress module 1102, an audiovisual control module 1103, a vibration generation module 1104, a synthesis module 1105, and a vibration generation control module 1106 are implemented.

Figure 3:
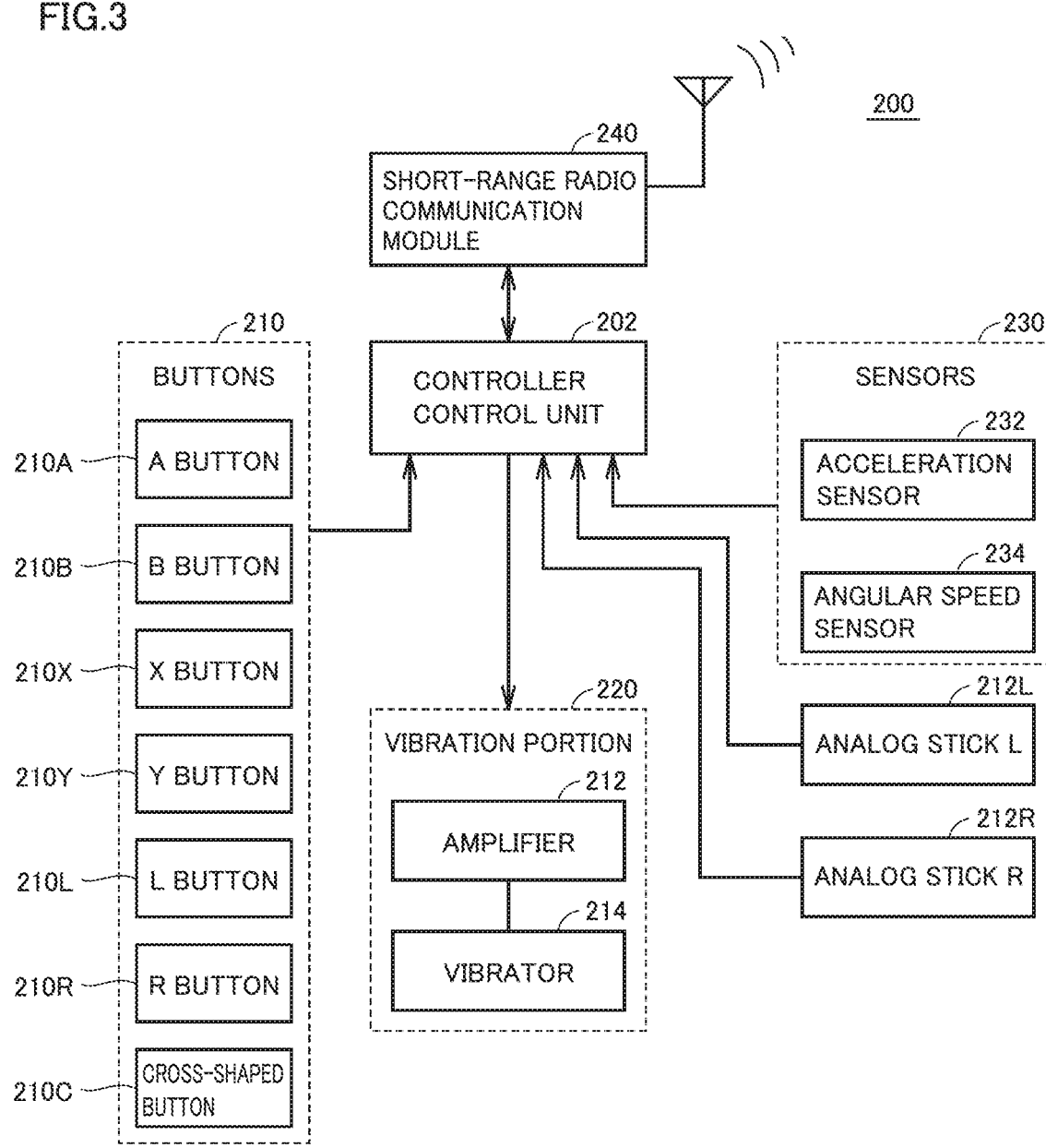
FIG. 3 shows an exemplary illustrative non-limiting drawing illustrating a configuration of a controller included in the game system in the present embodiment.

User operation determination module 1101 determines an operation performed by a user based on a signal (operation information) indicating the operation by the user onto an operation portion of controller 200 (for example, buttons 210 and analog sticks 212L and 212R shown in FIG. 3) and a result of detection by sensors 230 (see FIG. 3) of controller 200. User operation determination module 1101 outputs a content of the operation by the user to game progress module 1102 and vibration generation module 1104.

Game progress module 1102 corresponds to a game progress function to execute a game application and proceeds with game processing in response to an operation by a user. Specifically, game progress module 1102 updates video images and sound to be output in response to an operation by the user and outputs event information necessary for control of vibrations to be provided to the user.

Audiovisual control module 1103 generates video image outputs and sound outputs based on data from game progress module 1102 and provides output to audiovisual output driver 160. Audiovisual output driver 160 generates a video signal and an audio signal to be given to display 300 in accordance with outputs from audiovisual control module 1103.

Vibration generation module 1104 functions as at least a part of the vibration source shown in FIG. 5 described above and generates vibration data (vibration pattern) representing a time waveform for vibrating a terminal (controller 200 in the present embodiment). When each vibration pattern consists of one type of time waveform, vibration generation module 1104 generates first vibration data (for example, vibration pattern 1 shown in FIG. 9) representing a first time waveform for vibrating a terminal and second vibration data (for example, vibration pattern 2 shown in FIG. 9) representing a second time waveform for vibrating the terminal.

When each vibration pattern consists of a plurality of types (for example, two types) of time waveforms, vibration generation module 1104 generates first vibration data representing a first time waveform for vibrating a terminal and second vibration data representing a second time waveform for vibrating the terminal (the two pieces of vibration data are combined, for example, to vibration pattern 3 shown in FIG. 10), and generates third vibration data representing a third time waveform for vibrating a terminal and fourth vibration data representing a fourth time waveform for vibrating the terminal (the two pieces of vibration data are combined, for example, to vibration pattern 4 shown in FIG. 10).

Vibration generation module 1104 may generate a vibration pattern in accordance with progress of game processing. Specifically, when vibration generation module 1104 is notified of some event information from game progress module 1102, it extracts a vibration pattern corresponding to the event information from a prepared vibration pattern set 1107 and outputs the vibration pattern to synthesis module 1105. A plurality of vibration patterns may synchronously or asynchronously be input from vibration generation module 1104 to synthesis module 1105. Vibration generation module 1104 updates a generated vibration pattern every prescribed period (for example, 5 msecs. to several ten msecs.).

Thus, vibration generation module 1104 generates one or more pieces of vibration data (vibration patterns) in response to an event generated by game progress module 1102. When each vibration pattern consists of one type of time waveform, vibration generation module 1104 generates first vibration data representing a first time waveform or second vibration data representing a second time waveform in response to an event generated by game progress module 1102. When each vibration pattern consists of a plurality of types (for example, two types) of time waveforms, vibration generation module 1104 generates a combination of first vibration data and second vibration data as a first vibration pattern in response to an event generated by game progress module 1102 and generates a combination of third vibration data and fourth vibration data as a second vibration pattern in response to another event generated by game progress module 1102.

Game progress module 1102 may generate an event in response to an operation by a user. Game progress module 1102 is configured to generate a plurality of events, and generates a vibration pattern corresponding to each event. For example, vibration generation module 1104 generates one vibration pattern in response to one event generated by game progress module 1102 and generates another vibration pattern in response to another event different from the event.

Synthesis module 1105 performs processing for synthesizing vibration patterns as described above and outputs a synthesized pattern. When a command indicating the selection scheme is given to synthesis module 1105, any one of two vibration patterns is selectively output as a synthesized pattern every prescribed period based on an amplitude of a time waveform represented by one vibration pattern and an amplitude of a time waveform represented by the other vibration pattern. When a command indicating the addition scheme is given to synthesis module 1105, two vibration patterns are added and output as a synthesized pattern.

The output synthesized pattern is typically defined by frequency fL and amplitude αL on the low frequency side and frequency fH and amplitude αH on the high frequency side.

Vibration generation control module 1106 drives vibration portion 220 of controller 200 based on an output (synthesized pattern) from synthesis module 1105, in coordination with a drive signal generation module 2021. Vibration generation control module 1106 causes a terminal (controller 200) to vibrate based on vibration data selected by the synthesized pattern representing the selection means. More specifically, vibration generation control module 1106 transmits information on the synthesized pattern to controller 200 in accordance with information on the synthesized pattern from synthesis module 1105. Information on the synthesized pattern transmitted from vibration generation control module 1106 to controller 200 may successively be updated with a prescribed period. Though not shown, short-range radio communication module 140 (see FIG. 2) of processing apparatus 100 and short-range radio communication module 240 (see FIG. 3) of controller 200 may be located in a path of transmission of information from vibration generation control module 1106 to controller 200.

In controller 200, controller control unit 202 includes drive signal generation module 2021 as a part of its function. Drive signal generation module 2021 may be implemented by execution of a program by a processor, execution of firmware by a microcontroller including a hardwired circuit, or a dedicated semiconductor such as an application specific integrated circuit (ASIC). A known technique in accordance with each age can be adopted as a method of mounting controller control unit 202 including drive signal generation module 2021.

Drive signal generation module 2021 generates a drive signal based on information on a synthesized pattern from processing apparatus 100. In the present embodiment, since a synthesized pattern is designated with a frequency domain by way of example, drive signal generation module 2021 converts information in the frequency domain into a drive signal in a time domain. Processing for generating a drive signal in drive signal generation module 2021 will be described later. A drive signal output from drive signal generation module 2021 is given to vibration portion 220 of controller 200 and vibration portion 220 generates vibrations in response to the drive signal.

In game system 1 according to the present embodiment, information in a frequency domain (a frequency and an amplitude) is transmitted from processing apparatus 100 to controller 200 and converted into a drive signal in a time domain in controller 200. A necessary transmission band can advantageously be compressed by converting data exchanged between processing apparatus 100 and controller 200 into information in a frequency domain.

Without being limited to such a form, a drive signal in a time domain may be generated by processing apparatus 100 and transmitted to controller 200. Though a configuration in which a synthesis module is mounted on a side of processing apparatus 100 is exemplified in the description above, a synthesis module may be mounted on a side of controller 200. One or more vibration patterns may be transmitted from processing apparatus 100 to controller 200 and the side of controller 200 may perform processing for synthesizing vibration patterns or processing for generating a drive signal.

[F. Processing for Generating Drive Signal]

Processing for generating a drive signal in a time domain from a synthesized pattern designated by information in a frequency domain (a frequency and an amplitude) will now be described.

(f1: Generation Procedure)

Figure 15:
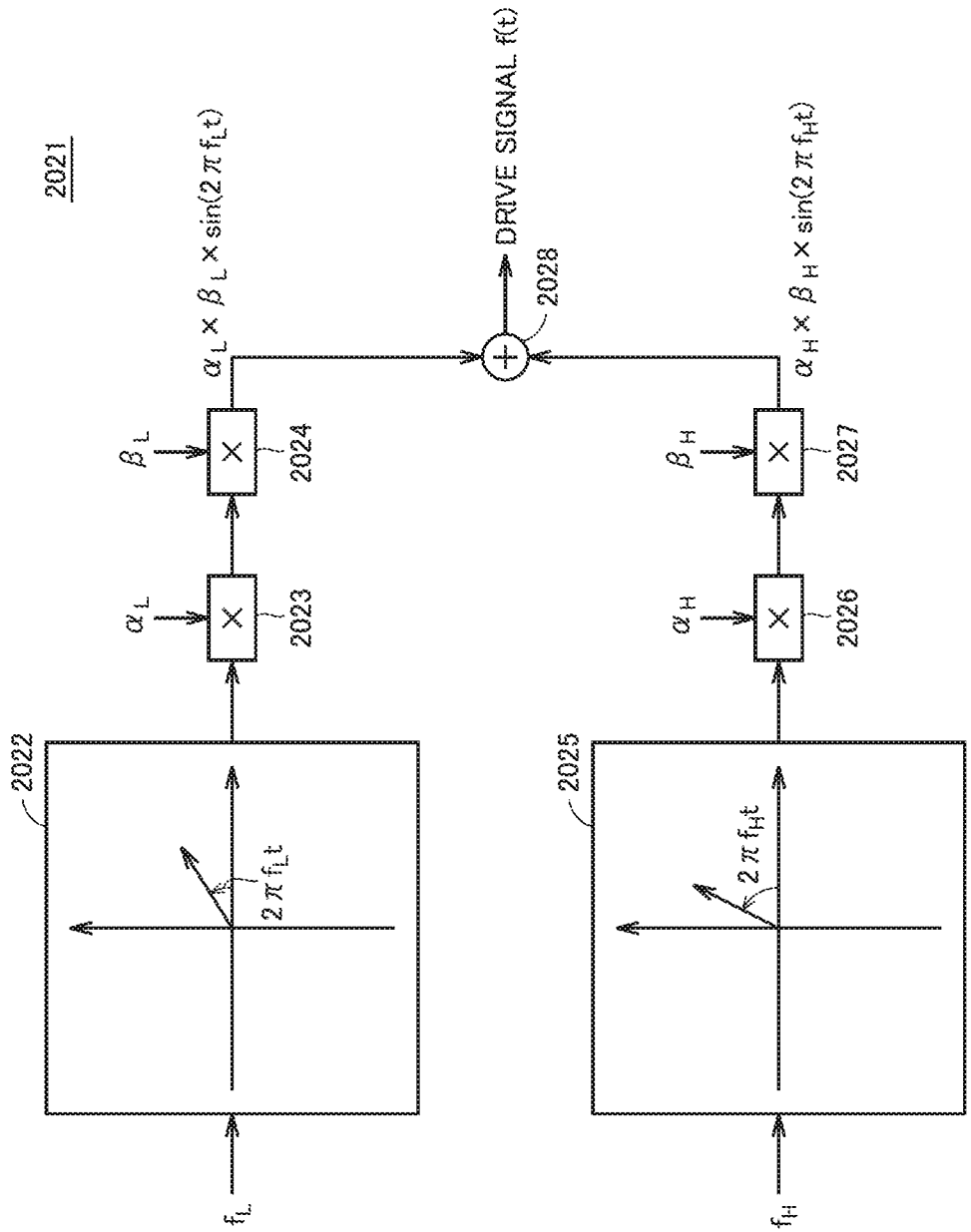
FIG. 15 shows an exemplary illustrative non-limiting drawing illustrating processing for generating a drive signal in the game system according to the present embodiment.

Processing for generating a drive signal in game system 1 according to the present embodiment will be described with reference to FIG. 15. FIG. 15 shows an example in which controller control unit 202 (to be more exact, drive signal generation module 2021) of controller 200 generates a drive signal.

Drive signal generation module 2021 receives information (frequency fL and amplitude $\alpha L$ on the low frequency side and frequency fH and amplitude $\alpha H$ on the high frequency side) designating a synthesized pattern from processing apparatus 100 and generates a drive signal in a time domain.

Drive signal generation module 2021 receives also correction coefficients $\beta L$ and $\beta H$ from processing apparatus 100. Correction coefficients $\beta L$ and $\beta H$ serve to adjust balance between vibrations on the low frequency side and vibrations on the high frequency side, and they are basically set to a value in a range of $0<\beta L\le 1$ and $0<\beta H\le 1$. Correction coefficients $\beta L$ and $\beta H$ are not essential features.

Drive signal generation module 2021 successively calculates $\alpha L\times\beta L\times\sin(2\pi\cdot fL\cdot t)$ as a component on the low frequency side of the drive signal and successively calculates $\alpha H\times\beta H\times\sin(2\pi\cdot fH\cdot t)$ as a component on the high frequency side of the drive signal. Then, the drive signal generation module outputs a result of synthesis of these components as a drive signal.

More specifically, drive signal generation module 2021 includes as its functions, phase determination modules 2022 and 2025, multiplication modules 2023, 2024, 2026, and 2027, and an addition module 2028. Each module included in drive signal generation module 2021 performs operation processing every prescribed operation period (for example, 1/4000 sec.). As described above, in a configuration without correction coefficients $\beta L$ and $\beta H$, multiplication modules 2024 and 2027 do not have to be provided.

Phase determination modules 2022 and 2025 calculate phase components (sin values at calculation timing) with calculation periods in accordance with frequencies fL and fH, respectively. Multiplication modules 2023 and 2026 multiply the phase components by amplitude components in accordance with amplitudes $\alpha L$ and $\alpha H$, respectively. Multiplication modules 2024 and 2027 multiply results of multiplication by the amplitude components by the correction coefficients in accordance with correction coefficients $\beta L$ and $\beta H$, respectively. Addition module 2028 generates a drive signal f(t) by summing results of calculation on the low frequency side and the high frequency side.

By adopting a calculation logic as shown in FIG. 15, a drive signal in accordance with a synthesized pattern designated in a frequency domain can be generated.

As described above, a synthesized pattern is updated every prescribed period (for example, 5 msecs. to several ten msecs.). As a result of updating, a frequency and an amplitude defining a synthesized pattern are varied stepwise. Continuity of a time waveform of a drive signal is preferably kept against such stepwise variation. Processing for keeping continuity of a time waveform of a drive signal will be described below.

Figure 16A:
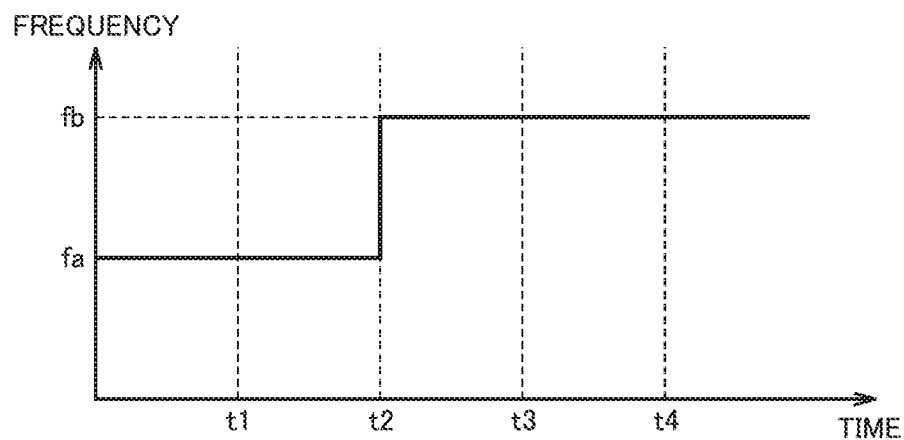
FIGS. 16A and 16B show exemplary illustrative non-limiting drawings illustrating processing for keeping continuity of time waveforms of a drive signal in the game system according to the present embodiment.

Processing for keeping continuity of a time waveform of a drive signal in game system 1 according to the present embodiment will be described with reference to FIGS. 16A and 16B. FIG. 16A shows one example of a time waveform of a phase of a synthesized pattern. In the synthesized pattern shown in FIG. 16A, a frequency fa is indicated in a section from a reference time to time t2, and a frequency fb is indicated at time t2 or later. At time t2, a frequency is varied stepwise from fa to fb.

Figure 16B:
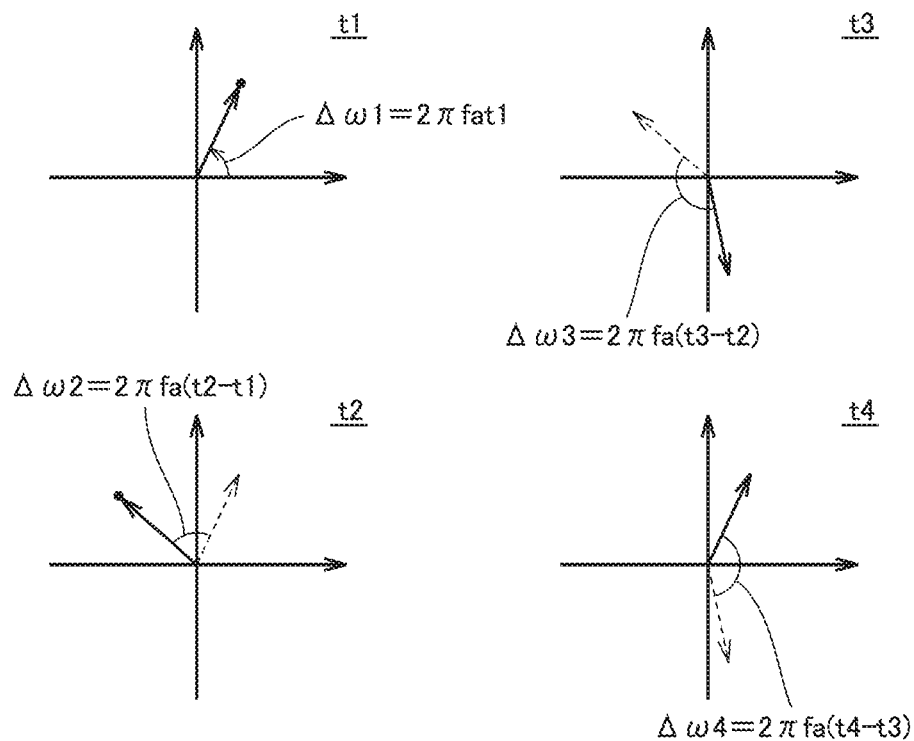

FIG. 16B shows a method of calculating a phase component at each of times t1 to t4 shown in FIG. 16A. At time t1, a displacement angle $\Delta\omega 1$ is calculated from frequency fa and a length of time from the reference time to time t1 with an initial position (phase zero) being defined as the reference, and a phase component is calculated based on an angle resulting from addition of displacement angle $\Delta\omega 1$ to the reference angle.

At subsequent time t2, with the phase at time t1 being defined as the reference, a displacement angle $\Delta\omega 2$ is calculated from frequency f and a length of time from time t1 to time t2 and a phase component is calculated based on an angle resulting from addition of displacement angle $\Delta\omega 2$ to the angle at time t1.

At subsequent time t3, similarly, a phase component is calculated with the phase at previous time t2 being defined as the reference. Since magnitude of a designated phase has varied, a varied phase fb is employed. Specifically, with the phase at time t2 being defined as the reference, a displacement angle $\Delta\omega 3$ is calculated from frequency fb and a length of time from time t2 to time t3 and a phase component is calculated based on an angle resulting from addition of displacement angle $\Delta\omega 3$ to the angle at time t2.

At subsequent time t4, with the phase at time t3 being defined as the reference, a displacement angle $\Delta\omega 4$ is calculated from frequency fb and a length of time from time t3 to time t4 and a phase component is calculated based on an angle resulting from addition of displacement angle $\Delta\omega 4$ to the angle at time t3.

As shown in FIG. 16B, at each timing of calculation of a drive signal, a present phase is calculated with a phase calculated at previous calculation timing being defined as the reference and then a phase component is output. By adopting such a method of sequentially adding an amount of phase increased from the previous calculation timing, continuity of a time waveform of a drive signal can be kept even though a phase designating a synthesized pattern is updated stepwise at any timing.

Figure 17:
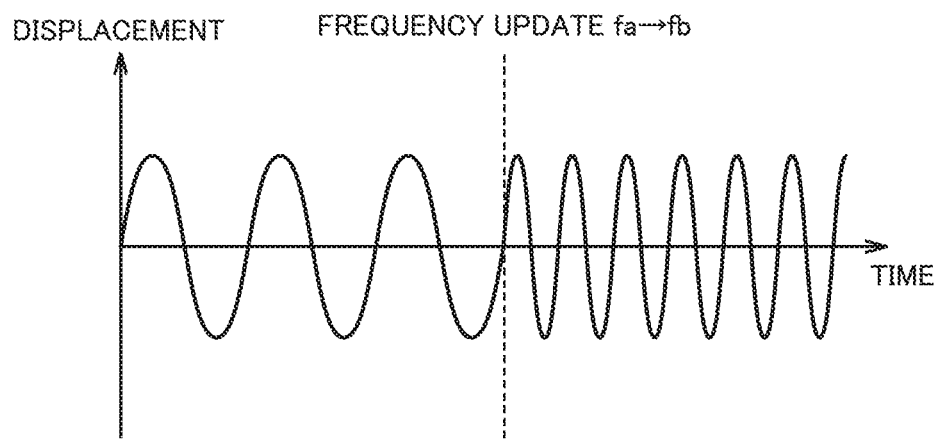
FIG. 17 shows an exemplary illustrative non-limiting drawing illustrating a time waveform of a drive signal generated in the game system according to the present embodiment.

FIG. 17 shows one example of a time waveform of a drive signal generated in game system 1. Though FIG. 17 shows an example in which a frequency of a synthesized pattern is updated from fa to fb at a certain time, it can be seen that continuity of a time waveform of a drive signal is kept also by updating of the frequency.

(f2: Mount Example)

Processing for calculating a phase component as shown in FIGS. 15 and 16 can be performed with an arithmetic technique. More specifically, a phase component can sequentially be calculated with a trigonometric function and an inverse function thereof. Though such a calculation method may be adopted, calculation processing may be complicated and hence a calculation method using a table as exemplified below may be adopted.

Processing for generating a drive signal with a reference table in game system 1 according to the present embodiment will be described with reference to FIG. 18. A reference table 2029 includes an addressed sequence and each column stores a rad value and a corresponding sin value. The rad value is arranged to monotonously increase in a prescribed step. Reference table 2029 corresponds to conversion of a trigonometric function (that is, a sin function) into a table. A trigonometric function (a sin function or a cos function) does not necessarily have to be used as reference table 2029, and a periodic function should only be used. For example, a saw-tooth wave having a prescribed period may be adopted. Though FIG. 18 exemplifies reference table 2029 configured such that one period ($2\pi$ radians) is divided by 4096 and increment by $2\pi/4096$ radian is allowed, a resolution should only be designed as appropriate in accordance with performance or requirement of a system.

Processing for calculation of a phase component by phase determination modules 2022 and 2025 (FIG. 15) is performed by using reference table 2029. Specifically, a count value corresponding to a current phase is obtained ((1) in FIG. 18). In succession, a next count value is calculated based on a designated frequency of a synthesized pattern ((2) in FIG. 18). To how many counts a displacement angle $\Delta\omega$ shown in FIG. 16 corresponds is calculated and a next count value is calculated by adding the calculated increment count to the current count value.

Then, a sin value corresponding to the calculated next count value is read ((3) in FIG. 18). The read sin value is defined as a phase component at next timing of calculation of a drive signal.

Similar processing is subsequently repeated. A count value after next is calculated based on a designated frequency of a synthesized pattern ((4) in FIG. 18). A sin value corresponding to the calculated count value after next is read ((5) in FIG. 18). The read sin value is defined as a phase component at timing after next of calculation of a drive signal.

By adopting such a form of mount with reference to reference table 2029, processing for calculating a sin value for calculating a phase component is no longer necessary, and basically, only a count value indicating a row to be referred to at each calculation timing should only be calculated. Therefore, even when a frequency is varied, continuity of a time waveform of a drive signal can be kept while computation cost is reduced.

(f3: Processing for Lessening Amount of Change)

FIG. 16 described above shows an example in which a frequency of a synthesized pattern is varied stepwise from fa to fb for the sake of convenience of description. In game system 1 according to the present embodiment, even when a frequency of a synthesized pattern is varied stepwise, continuity of a time waveform of a drive signal is kept by adopting the processing method as described above. A time waveform, however, may also significantly be distorted before and after stepwise variation. Therefore, processing for lessening an amount of change which may be produced in a time waveform may be adopted.

Figure 19A:
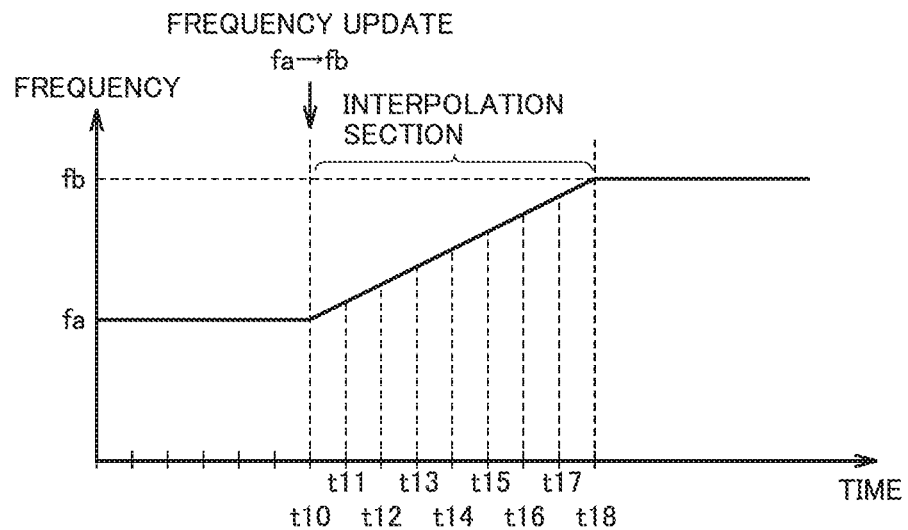
FIGS. 19A and 19B show exemplary illustrative non-limiting drawings illustrating processing for lessening an amount of change in the game system according to the present embodiment.
Figure 19B:
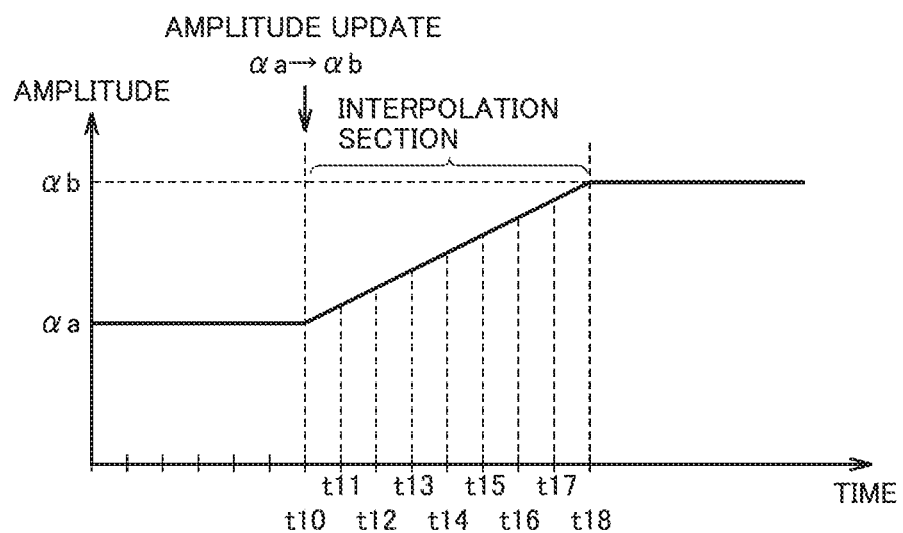

Processing for lessening an amount of change in game system 1 according to the present embodiment will be described with reference to FIGS. 19A and 19B. FIG. 19A shows an example in which a frequency of a synthesized pattern is varied from fa to fb and FIG. 19B shows an example in which an amplitude of a synthesized pattern is varied from $\alpha a$ to $\alpha b$.

As shown in FIG. 19A, it is assumed that a frequency of a synthesized pattern is updated from fa to fb at time t10. In this case, it is assumed that a frequency is varied from fa to fb with a certain period (an interpolation section) being spent. Change over time from frequency fa to fb may be in any manner, and interpolation using a linear function or interpolation using a high-dimensional function may be applicable. FIG. 19 shows an example of interpolation using a linear function (linear interpolation) for the sake of convenience of description.

Times t10 to t18 shown in FIG. 19A correspond to timing of calculation of a drive signal. A generated drive signal is gradually varied by using interpolated characteristics in generating a drive signal at each calculation timing. An increment in phase calculated at each calculation timing is not varied stepwise at a certain time but gradually increased in accordance with the interpolated characteristics. By lessening such an amount of change in increment in phase, change over time which appears in a finally generated drive signal also changes from abrupt change to gradual change.

By adopting the processing for lessening an amount of change shown in FIG. 19A, possibility that a vibratory stimulus as not intended by an application developer is provided to a user can be suppressed.

The processing for lessening an amount of change is applicable also to stepwise variation in amplitude of a synthesized pattern in FIG. 19B, with the technique similar to that in FIG. 19A. By applying such processing for lessening an amount of change, possibility that a vibratory stimulus as not intended by an application developer is provided to a user can be suppressed.

Displacement in generated drive signal is determined by a product of a phase component and an amplitude. Therefore, even though an amplitude is varied stepwise, abrupt change over time does not necessarily appear in a generated drive signal. Therefore, the processing for lessening an amount of change does not have to be applied to both of a frequency and an amplitude.

As shown in FIGS. 19A and 19B, delay to some extent is caused after a value for a frequency and/or an amplitude is varied stepwise by the time the value is actually varied to the updated value. This delay, however, can sufficiently be little as compared with progress of game processing and it does not give rise to a practical problem.

In game system 1 according to the present embodiment, a vibratory stimulus is expressed with two combinations of a frequency component and an amplitude. Therefore, the processing shown in FIGS. 19A and 19B is preferably applied for each combination. The processing for lessening an amount of change as shown in FIG. 19 may be applied to each or only any one of the low frequency side and the high frequency side.

The interpolation processing as shown in FIGS. 19A and 19B may be mounted on the side of controller control unit 202 (to be more exact, drive signal generation module 2021) of controller 200 or on the side of processing apparatus 100. By mounting the processing on the side of controller 200, influence on a rate of communication between processing apparatus 100 and controller 200 can be suppressed.

[G. Form of Distribution of Program]

A form of distribution of a program including a synthesis module used for generating a synthesized pattern in game system 1 according to the present embodiment will now be described with reference to FIGS. 20A and 20B.

Figure 20A:
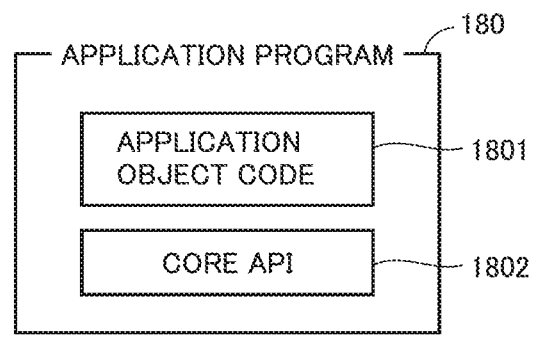
FIGS. 20A and 20B show exemplary illustrative non-limiting drawings illustrating a form of distribution of a vibration control program involved with control of the vibration portion in the game system according to the present embodiment.
Figure 20B:
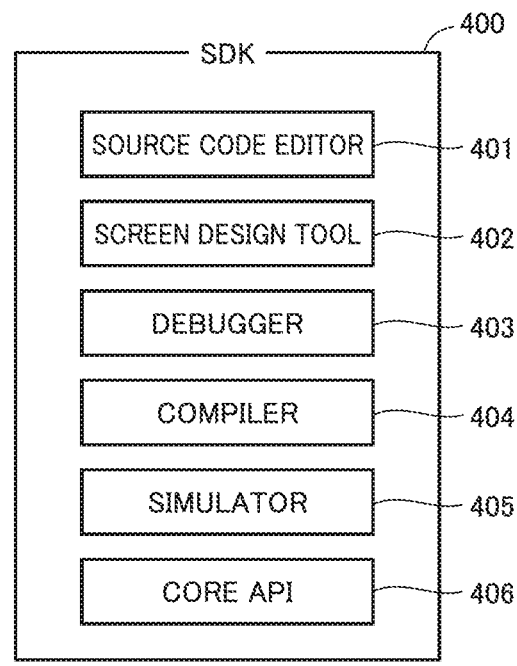

FIGS. 20A and 20B show one example of a form of distribution of a vibration control program involved with control of the vibration portion in game system 1 according to the present embodiment. FIG. 20A shows an example in which a program module necessary for control of the vibration portion is mounted on a part of application program 180 as an application programming interface (API). FIG. 20B shows an example of distribution as a software development kit (SDK) including a program module necessary for control of the vibration portion.

In the description shown in FIGS. 20A and 20B, "API" means one or more program modules which can be made use of by any application program. Any form is applicable as a specific form of one or more program modules. Typical examples include a library, a sub routine, and an object class.

Referring to FIG. 20A, application program 180 (see FIG. 2) typically includes an application object code 1801 which is an entity of an application program and a core API 1802 made use of by application object code 1801 at the time of execution.

A synthesis module used for generating a synthesized pattern as described above may be included as a part of core API 1802. A developer of an application can mount generation of a synthesized pattern as described above by describing a declare statement and designation of a variable for making use of a synthesis module included in core API 1802 in a code of the application.

Referring to FIG. 20B, an SDK 400 provided to a developer of an application typically includes a source code editor 401, a screen design tool 402, a debugger 403, a compiler 404, a simulator 405, and a core API 406. Core API 406 may include a synthesis module used for generating a synthesized pattern as described above.

A developer of an application can install SDK 400 in processing apparatus 100 or a general-purpose computer and develop any application. The developer can readily mount a logic making use of a synthesis module used for generating a synthesized pattern as described above by using source code editor 401 to add description involved with use of any API included in core API 406, similarly to execution of a created application program in processing apparatus 100 when the application program is executed on simulator 405.

[H. Processing Procedure]

Figure 21:
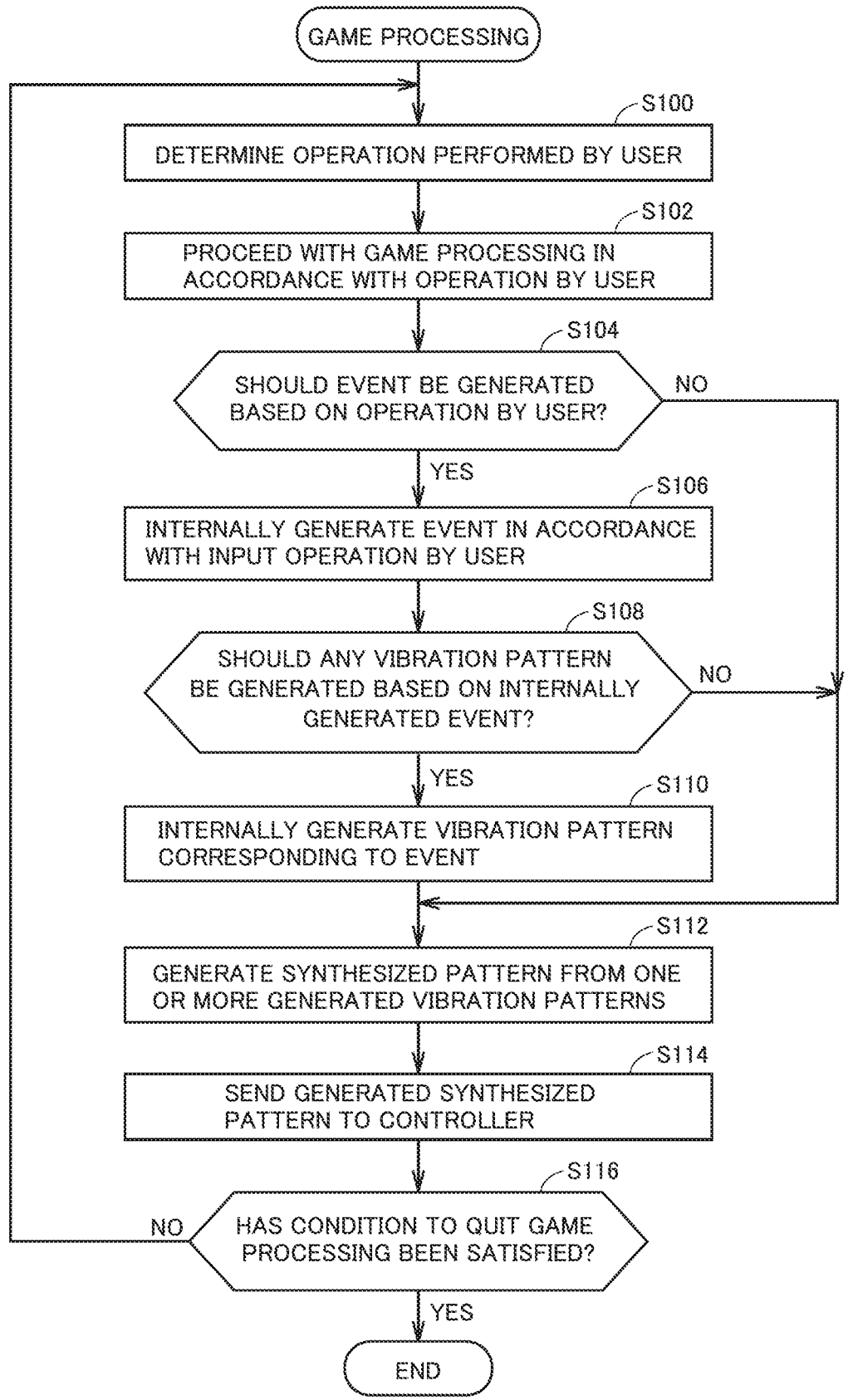
FIG. 21 shows an exemplary illustrative non-limiting flowchart illustrating a procedure of processing performed in the game system according to the present embodiment.

Processing performed in game system 1 according to the present embodiment will now be described with reference to FIG. 21. FIG. 21 is a flowchart showing a procedure of processing performed in game system 1 according to the present embodiment. Each step shown in FIG. 21 is typically performed by execution of a program by CPU 102 of processing apparatus 100.

Referring to FIG. 21, CPU 102 determines an operation performed by a user based on operation information indicating the operation by the user onto the operation portion of controller 200 and a result of detection by sensors 230 (see FIG. 3) of controller 200 (step S100). CPU 102 proceeds with game processing in response to the operation by the user determined in step S100 (step S102). The proceeding of the game processing includes processing for updating video images and sound to be output. Concurrently, CPU 102 determines whether or not an event should be generated based on the operation by the user determined in step S100 (step S104). When an event should be generated (YES in step S104), CPU 102 internally generates an event in accordance with an input operation by the user (step S106). In succession, CPU 102 determines whether or not some kind of vibration pattern should be generated based on the internally generated event (step S108).

When an event does not have to be generated (NO in step S104) or when some kind of vibration pattern does not have to be generated (NO in step S108), the process proceeds to step S112.

When some kind of vibration pattern should be generated (YES in step S108), CPU 102 internally generates a vibration pattern corresponding to the event (step S110).

CPU 102 performs processing for synthesizing generated one or more vibration patterns as described above and generates a synthesized pattern (step S112). When only a single vibration pattern is generated, processing for synthesizing a synthesized pattern is substantially skipped and one generated vibration pattern is output. When a plurality of vibration patterns are generated, with designation of the selection scheme, any one vibration pattern is output every prescribed period in accordance with the method described in d1. With designation of the addition scheme, a synthesized pattern resulting from synthesis of a plurality of vibration patterns is output in accordance with the method described in d2.

Finally, CPU 102 sends the generated synthesized pattern to controller 200 (step S114). Controller 200 generates a drive signal based on a command of the synthesized pattern from CPU 102 and drives vibration portion 220.

CPU 102 determines whether or not a condition for quitting game processing has been satisfied (step S116). For example, whether or not end of game processing has been indicated through an operation by the user is determined. When a condition for quitting game processing has not been satisfied (NO in step S116), processing in step S100 or later is repeated.

When a condition for quitting the game processing has been satisfied (YES in step S116), the game processing ends.

[I. Advantages]

In the game system according to the present embodiment, a synthesis module can be made use of in any application. According to the synthesis module, a plurality of vibration patterns are prepared and a degree of freedom in creating such an application as generating a vibration pattern of a type in accordance with progress of a game (occurrence of an event brought about by an operation by a user) can be enhanced. When the synthesis module is operated with the selection scheme, a vibration pattern greater in amplitude is preferentially output so that a vibratory stimulus in accordance with a vibration pattern most in conformity with an intention of an application developer can be provided to the user as the game proceeds. By operating the synthesis module with the addition scheme, the synthesis module is applicable also to such a scene that a vibratory stimulus which is combination of a plurality of vibration patterns is desirably provided to a user.

The synthesis module according to the present embodiment thus achieves an advantage to enhance a degree of freedom of an application developer in each of the selection scheme and the addition scheme and the degree of freedom can further be enhanced because selection from these schemes can arbitrarily be made.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A vibration control system comprising:
a first vibration command generator that generates first vibration data representing a first time waveform;
a second vibration command generator that generates second vibration data representing a second time waveform;
a selector configured to select, for each of a plurality of prescribed periods in which the first vibration data generated by the first vibration command generator and the second vibration data generated by the second vibration command generator are input thereto, which one of the first time waveform represented by the first vibration data the second time waveform represented by the second vibration data, has the greater amplitude in the respective prescribed period; and
a vibrator configured to vibrate in accordance with the one of the first and second time waveforms selected as having the greater amplitude within each of the prescribed periods.

2. The vibration control system according to claim 1, wherein the selector is configured to select the vibration data representing the time waveform greater in amplitude, regardless of whether the first time waveform and the second time waveform are identical to or different from each other in frequency.

3. The vibration control system according to claim 1, wherein
the first vibration data is composed of a first combination of first values respectively representing frequency and amplitude of the first time waveform,
the second vibration data is composed of a second combination of second values respectively representing frequency and amplitude of the second time waveform,
the first vibration command generator is configured to generate the first combination of the first values every prescribed period as the first vibration data, and
the second vibration command generator is configured to generate the second combination of the second values every prescribed period as the second vibration data.

4. The vibration control system according to claim 1, wherein
the first vibration command generator is configured to simultaneously generate a plurality of first pieces of vibration data including the first vibration data, and
the second vibration command generator is configured to simultaneously generate a plurality of second pieces of vibration data including the second vibration data.

5. The vibration control system according to claim 4, wherein the selector is configured to select, for each prescribed period in which the plurality of first pieces of vibration data generated by the first vibration command generator and the plurality of second pieces of vibration data generated by the second vibration command generator are input thereto, the one of the first and second pieces of vibration data that represents the waveform with the greater amplitude in the respective prescribed period.

6. The vibration control system according to claim 4, wherein the selector is configured to select, for each prescribed period in which the plurality of first pieces of vibration data generated by the first vibration command generator and the plurality of second pieces of vibration data generated by the second vibration command generator are input thereto, the one of the first and second pieces of vibration data that represents the greater total amplitude.

7. The vibration control system according to claim 1, wherein
the first vibration command generator is configured to generate third vibration data representing a third time waveform in addition to the first vibration data,
the second vibration command generation generator is configured to generate fourth vibration data representing a fourth time waveform in addition to the second vibration data,
when the first vibration data and the third vibration data generated by the first vibration command generator and the second vibration data and the fourth vibration data generated by the second vibration command generator are input, the selector is configured to select either first or third vibration data based on which represents the waveform greater in amplitude every prescribed period, and to select either the second or fourth vibration data based on which represents the waveform greater in amplitude every prescribed period.

8. The vibration control system according to claim 7, wherein
the first vibration data is composed of a first combination of values respectively representing frequency and amplitude of the first time waveform,
the second vibration data is composed of a second combination of values respectively representing frequency and amplitude of the second time waveform,
the third vibration data is composed of a third combination of values respectively representing frequency and amplitude of the third time waveform, the fourth vibration data is composed of a fourth combination of values respectively representing frequency and amplitude of the fourth time waveform, the first vibration command generator is configured to update the first vibration data and the third vibration data every prescribed period, and the second vibration command generator is configured to update the second vibration data and the fourth vibration data every prescribed period.

9. The vibration control system according to claim 7, wherein the third time waveform is lower in frequency than the first time waveform and the fourth time waveform is lower in frequency than the second time waveform.

10. The vibration control system according to claim 1, wherein:

a game progress processor that executes a game application, the first and second vibration command generators are configured to generate vibration data in response to an event generated by the game progress processor.

11. The vibration control system according to claim 10, wherein the first vibration command generator is configured to generate the first vibration data in response to a first event generated by the game progress processor, and the second vibration command generator is configured to generate the second vibration data in response to a second event different from the first event.

12. The vibration control system according to claim 10, wherein the game progress processor is configured to generate the event in response to an operation by a user.

13. The vibration control system according to claim 1, wherein the first time waveform is generated to exhibit weak and continual vibrations, and the second time waveform is generated to exhibit strong and short vibrations.

14. The vibration control system according to claim 1, wherein the vibrator has a plurality of resonance frequencies, the terminal includes the vibrator, and a frequency of the first time waveform and a frequency of the second time waveform are set in accordance with the resonance frequency of the vibrator.

15. A vibration control method comprising:

generating first vibration data representing a first time waveform;

generating second vibration data representing a second time waveform; and for each of a plurality of defined time intervals in which the first vibration data and the second vibration data are input, selecting which one of the first and second vibration data represents the time waveform having the greater amplitude in the respective defined time interval; and causing a terminal to vibrate within each of the prescribed periods based on the selected vibration data.

16. The method according to claim 15, further comprising:

simultaneously generating a plurality of first pieces of vibration data including the first vibration data, and simultaneously generating a plurality of second pieces of vibration data including the second vibration data.

17. The method according to claim 16, wherein the selecting is practiced by selecting, for each defined time interval, the one of the plurality of first pieces of vibration data and the plurality of second pieces of vibration data that represents the time waveform having the greatest total amplitude in that defined time interval.

18. The method according to claim 15, further comprising:

executing a game application;

generating the first vibration data in response to a first event occurring during execution of the game application; and generating the second vibration data in response to a second event occurring during execution of the game application.

19. A non-transitory computer-readable storage medium with an executable vibration control program stored thereon, the control program being executed by a processor of a terminal, the vibration control program causing the processor to perform functionality comprising:

generating first vibration data representing a first time waveform;

generating second vibration data representing a second time waveform;

selecting, period-by-period and based on input including the first vibration data and the second vibration data, which one of the first time waveform represented by the first vibration data and the second time waveform represented by the second vibration data has the greater amplitude; and causing the terminal to vibrate based on the one of the first and second time waveforms selected as having the greater amplitude within each of the periods.

20. A non-transitory computer-readable storage medium with an executable vibration control program stored thereon, the control program being executed by a processor of a terminal, the vibration control program causing the processor to perform functionality comprising:

accepting first vibration data representing a first time waveform and second vibration data representing a second time waveform;

selecting, for every one of a plurality of periods in which the first vibration data and the second vibration data are input, which one of the first time waveform represented by the first vibration data and the second time waveform represented by the second vibration data has the greater amplitude in the respective period; and causing a vibrator associated with the terminal to vibrate responsive to the selecting.

21. The non-transitory computer-readable storage medium according to claim 20, wherein the control program is further executable to perform functionality comprising:

simultaneously generating a plurality of first pieces of vibration data including the first vibration data, and simultaneously generating a plurality of second pieces of vibration data including the second vibration data.

22. The non-transitory computer-readable storage medium according to claim 21, wherein the selecting is practiced by selecting, for each period, the one of the plurality of first pieces of vibration data and the plurality of second pieces of vibration data that represents the time waveform having the greatest total amplitude in that period.

23. An electronic device, comprising:

a vibrator; and at least one processor and a memory, the memory storing a vibration control program, executable by the at least one processor to control the electronic device to at least:

access first vibration data corresponding to a first waveform and second vibration data corresponding to a second waveform; and in each of a plurality of periods:
determine, using the first and second vibration data, which of the first and second waveforms then has the greater amplitude, and control the vibrator to vibrate in accordance with the one of the first and second waveforms determined to have the greater amplitude for that respective period.

24. The electronic device according to claim 23, wherein the determination of which of the first and second waveforms has the greater amplitude is made without regard to their respective frequencies.

25. The electronic device according to claim 23, wherein the first waveform is generated to exhibit weak and continual vibrations, and the second waveform is generated to exhibit strong and short vibrations.

26. The electronic device according to claim 23, wherein the at least one processor is further configured to execute a game application that generates vibration data responsive to events that take place in connection therewith.

* * * * *